US005845120A

United States Patent [19]
Reddy et al.

[11] Patent Number: 5,845,120
[45] Date of Patent: Dec. 1, 1998

[54] METHOD AND APPARATUS FOR LINKING COMPILER ERROR MESSAGES TO RELEVANT INFORMATION

[75] Inventors: Achut P. Reddy, San Jose; Daniel J. O'Leary, Mountain View; Robert B. Jervis, Monte Sereno; Robin Jeffries, Palo Alto; Evan W. Adams, San Leandro, all of Calif.

[73] Assignee: Sun Microsystems, Inc., Mountain View, Calif.

[21] Appl. No.: 530,595

[22] Filed: Sep. 19, 1995

[51] Int. Cl.⁶ .................................................. G06F 9/45
[52] U.S. Cl. ........................................ 395/704; 707/513
[58] Field of Search .............................. 395/704, 183.14, 395/336–338, 335; 345/335–338; 707/507, 513

[56] References Cited

U.S. PATENT DOCUMENTS

| | | | |
|---|---|---|---|
| 4,500,964 | 2/1985 | Nickle | 364/300 |
| 4,648,062 | 3/1987 | Johnson et al. | 364/900 |
| 4,800,485 | 1/1989 | Ackroff et al. | 364/200 |
| 5,315,697 | 5/1994 | Nagamatsu | 395/155 |
| 5,361,361 | 11/1994 | Hickman et al. | 395/700 |
| 5,388,251 | 2/1995 | Makino et al. | 395/575 |
| 5,483,632 | 1/1996 | Kuwamoto et al. | 395/156 |
| 5,581,694 | 12/1996 | Dudzik et al. | 395/338 |
| 5,603,025 | 2/1997 | Tabb et al. | 395/602 |

OTHER PUBLICATIONS

Bauchop, P. F., "Error Message Explanations In An On–Line Tutorial", IBM Technical Disclosure Bulletin, vol. 22, No. 5, pp. 2114–2115, Oct. 1979.

Berry, R. E., Johnson, S. E., Karat, J. T., and Ruiz, T. M., "Contextual Help Facility for Interactive Systems", IBM Technical Disclosure Bulletin, vol. 27, No. 10B, p. 6127, Mar. 1985.

Fenchel, R. S., and Estrin, G., "Self–Describing Systems Using Integral Help", IEEE Transactions on Systems, Man, and Cybernetics, vol. SMC–12, No. 2, pp. 162–167, Mar./Apr. 1982.

Glasner, I. D., and Hayes, P. J., "Automatic Construction of Explanation Networks for a Cooperative User Interface", ACM SIGSOC Bulletin, Proc. of Jt. Conf. on Easier and More Productive Use of Computing Systems, Ann Arbor, pp. 1–17, May 1981.

Hayes, P. J., "Uniform Help Facilities For A Cooperative User Interface", AFIPS Conference Proceedings, 1982 National Computer Conference, pp. 469–474, Houston, Texas, Jun. 7–10, 1982.

Hayes, P., Ball, E., and Reddy, R., "Breaking The Man–Machine Communication Barrier", IEEE Computer, pp. 19–30, Mar. 1981.

Houghton Jr., R.C., "Online Help Systems: A Conspectus", Communications of the ACM, vol. 27, No. 2, pp. 126–133, Feb. 1984.

(List continued on next page.)

*Primary Examiner*—James P. Trammell
*Assistant Examiner*—Kakali Chaki
*Attorney, Agent, or Firm*—Fenwick & West LLP

[57] ABSTRACT

Methods and apparati including computer program products link compiler error messages to information relevant to an error causing the compiler to generate the error message by adding link information to the compiler error messages. The error messages are displayed to the user without the link information. Portions of the visible error messages pertaining to the link information are highlighted, and upon selection by the user of the highlighted portion of the error message, information relevant to the highlighted error message is automatically displayed, for example, by running an editor, loading the source file which generated the error message, and displaying the relevant portion of the source file, or by running a help facility and displaying help information relevant to the error.

26 Claims, 9 Drawing Sheets

OTHER PUBLICATIONS

Kehler, T. P., and Barnes, M., "A Text Interface For User Assistance And Information Management", Twenty–Fourth IEEE Computer Society International Conference, Digest of Papers, Compcon 82, High Technology In The Information Industry, pp. 366–374, Feb. 22–25, 1982.

Kehler, T. P., and Barns, M., "Interfacing To Text Using HELPME", Proceedings Part II, Human Interaction and the User Interface, Selected Papers from the Conference on Easier and More Productive Use of Computer Systems, pp. 116–124, Ann Arbor, Michigan, May 20–22, 1981.

Lee, W., "?: A Context–Sensitive Help System Based On Hypertext", $24^{th}$ ACM/IEEE Design Automation Conference, Paper 25.3, pp. 429–435, 1987.

Nakamura, O., and Murai, J., "On–Line Manual System For Software Development On Unix", USENIX, Software Tools, Summer 83 Toronto Conference Proceedings, pp. 20–30, 1983.

Ragan, R. R., "Context: An On–Line Documentation System", Software—Practice and Experience, vol. 16(3), pp. 217–224, Mar. 1986.

Relles, N., Sondheimer, N. K., and Ingargiola, G., "A Unified Approach To Online Assistance", AFIPS Conference Proceedings, 1981 National Computer Conference, pp. 383–388, Chicago, Illinois, May 4–7, 1981.

Sharma, D. K. and Gruchacz, A. M., "The Display Text Editor TED: A Case Study In The Design And Implementation Of Display–Oriented Interactive Human Interfaces", IEEE Transactions on Communications, vol. Com–30, No. 1, Jan. 1982.

```
<A HREF=editor:file1.c:10.37> "file1.c", line 10: </A>
undefined symbol in column 37  at:xyz
<A HREF=helpviewer:symbols> (help: symbols) </A>
```

```
<A HREF=editor:file1.c:20.37> "file1.c", line 20: </A>
undefined symbol in column 37  at:xyz
<A HREF=helpviewer:symbols> (help: symbols) </A>
```

Fig 4

METHOD AND APPARATUS FOR LINKING COMPILER ERROR MESSAGES TO RELEVANT INFORMATION

RELATED APPLICATIONS

The subject matter of this application is related to the subject matter of application Ser. No. AA/BBB,BBB, entitled, "METHOD AND APPARATUS FOR INTEGRATING EDITORS WITH APPLICATIONS" filed concurrently herewith by Robert B. Jervis, Daniel J. O'Leary, Achut P. Reddy, Robin Jeffries and Evan W. Adams and having the same assignee as the present invention and is incorporated by reference in its entirety.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF INVENTION

The present invention relates to software compilers, and specifically to the resolution of errors in a software compiler.

BACKGROUND OF THE INVENTION

Conventional compilers translate source code into object code for execution by a computer. Many conventional compilers are implemented as software on a conventional computer system, such as the Turbo C++ compiler commercially available from Borland International of Scotts Valley, Calif. running under the MS-DOS operating system commercially available from Microsoft Corporation of Redmond, Wash.

As shown in FIG. 1, a conventional computer system includes a processor 110 coupled to a first storage device 112 such as a memory, and a second storage device 114 such as a disk storage system. A user may interact with the system via a keyboard 116, mouse 118 and a monitor 120. Computer program product reader 107, such as a memory, hard drive, floppy disk drive or CD-ROM drive can is coupled to processor 101 to allow computer readable program code devices 97 such as encoded bits of a computer program product 99 such as a memory, hard disk, floppy disk, CD-ROM or other storage device to be input to processor 101 and stored in memory 108 and/or disk storage 103 for use in controlling the operation of the computer system 109 when computer program product 99 is inserted into slot 98 of computer program product reader 107. An operating system is loaded into memory 108 or disk storage 103 or a combination of memory 108 and disk storage 103 and instructs processor 101 to load and execute compilers or other applications described below. Many conventional compilers or other applications are distributed on computer program products 99, such as diskettes, storage devices such as ROMs or storage devices such as disk storage system 114, each containing computer readable code devices 97 which cause the computer system 109 operate in a particular manner such as is described herein when a copy of the code devices is loaded into the computer system 109.

Many compilers also detect the presence of errors in the source code. Some conventional compilers provide a listing of all errors in the source code to allow the programmer to see many errors simultaneously. FIG. 2 shows the output of one such conventional compiler. Error messages 212, 214 are located in a build output window 210 of the compiler, although other compilers utilize other output display methods. Error messages 212, 214 each instruct the user that a symbol was undefined. This capability allows the programmer to locate and correct several errors simultaneously. For example by defining one symbol, errors corresponding to error messages 212 and 214 may be simultaneously corrected. Thus, similar or related errors may be easily corrected. However, to correct each error, the source code location for each error must be identified to allow the user to view the error. If the meaning or cause of the error is not apparent, the user may have to search information using a help facility. Some compilers assist the user in this process by providing information such as the file name and source code line number to allow the user to locate the error using an editor, or by suggesting a search topic to use to locate the relevant information in the help facility. Error messages 212, 214 provide the file name, line number and search topic for each error. The user may have to start the source code file editor or help facility, and then manually locate the line or topic.

Some compilers, such as the conventional Delphi Pascal compiler commercially available from Borland International of Scotts Valley, Calif., locate errors sequentially, one error at a time. Rather than displaying a large number of errors simultaneously, these compilers utilize an integrated editor to display a portion of the source code containing the first sequential error, highlight the source code line containing the error and display an error explanation at the bottom of the screen. The user corrects one error and directs the compiler to recompile the source code, which recompiles or continues compiling at the location of the corrected error until the next source code error is reached or the compiler completes the compilation successfully.

Both types of editors require the programmer to utilize a separate help facility to locate help information relevant to each error. This makes the process of correcting more difficult errors for which help is required more cumbersome, because the user must run the help facility and locate the most relevant help information.

SUMMARY OF INVENTION

The present invention displays multiple-compiler error messages that are linked to other information, such as the location of the error in the source code or the location of additional relevant help information. Certain fields in the error messages are highlighted, and the user may select the highlighted field using an input device such as a mouse. Upon selection of a field, a program such as an editor or a help facility may be executed, the relevant file loaded into the program, and the program instructed to display information relevant to the field in the error which the user selected.

Such a capability provides the benefits of the display of multiple-error messages with the ease of use of automatic source code location and without requiring an integrated editor to be written, included with the compiler and used by the user. In addition, these benefits are extended to automatic help location, allowing ease of obtaining help information.

A BRIEF DESCRIPTION OF THE DRAWINGS

FIG. 4 is a pictorial illustration showing both hidden and visible text in a completed error message according to an embodiment of the present invention.

DETAILED DESCRIPTION OF A PREFERRED EMBODIMENT

Figure 1:
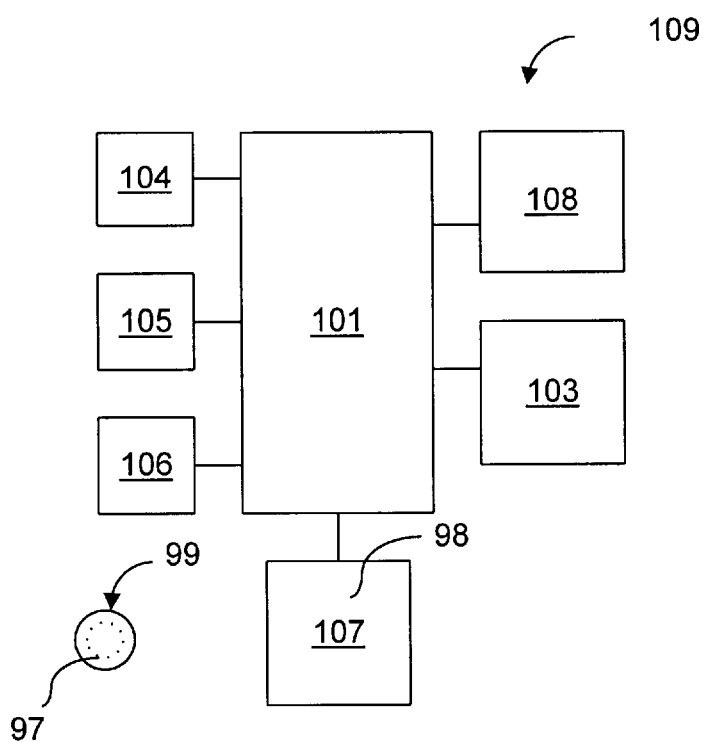
FIG. 1 is a block schematic diagram of a conventional computer system.
Figure 2:
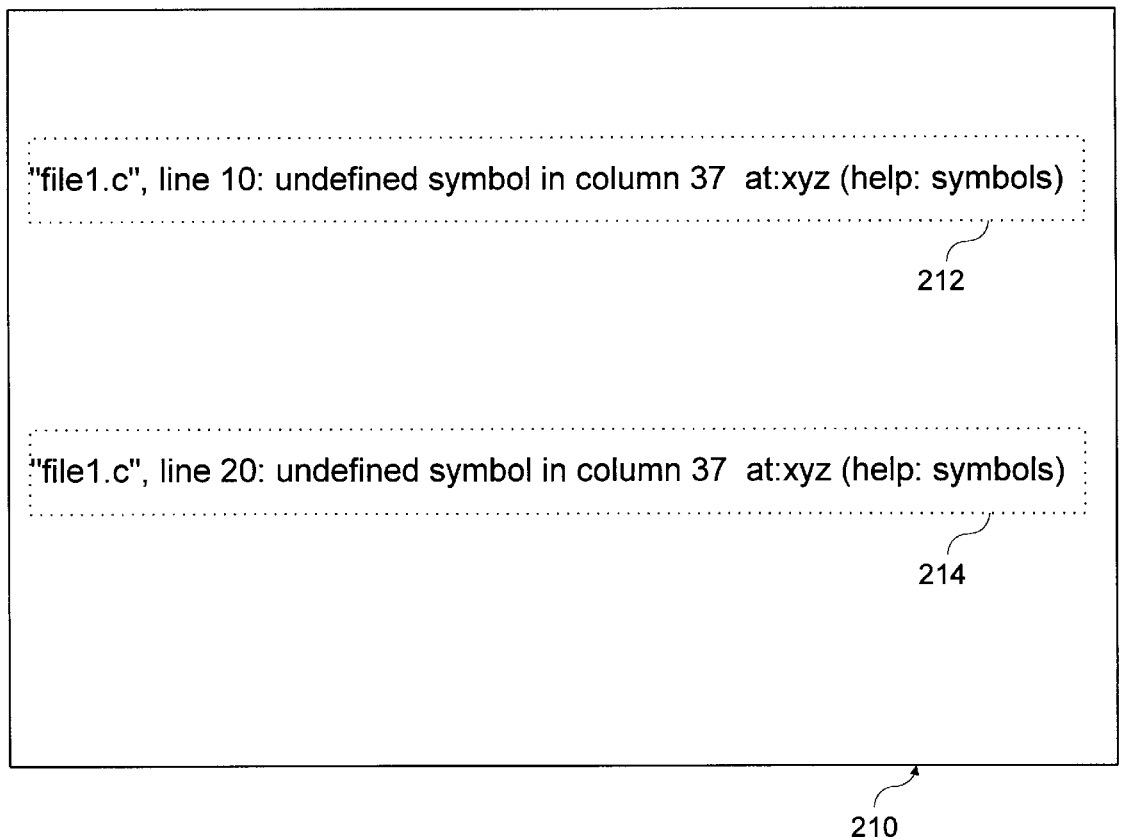
FIG. 2 is a pictorial illustration of an error code display screen of a conventional compiler.

Referring now to FIGS. 1, 2, 3A, 4 and 5, one embodiment of a system 308 for linking compiler-generated error messages with relevant portions of a source code listing and help information is shown. In one embodiment, system 308 is implemented in software and distributed on a computer program product to operate on a conventional computer system such as the computer system 109 shown in FIG. 1. Conventional compiler 310 accepts source files at its input 312 and generates error messages such as the error messages 212, 214 at its output 314.

In one embodiment, filter 320 accepts at its input 322 the error messages from the output 314 of compiler 310. Scanner 324 scans the error messages to identify the source file and position within the source file of the error, as well as other information relevant to the error. In one embodiment, scanner 324 scans the error message 212, 214 and identifies the file as File1.c by selecting the text in the quotation marks, the line number of the error equal to 10 by selecting the text following the word 'line', and the column number of the error equal to 37 by selecting the text following the word column. Scanner also locates and selects any text within parentheses.

Markup text assembler 326 adds text to be used by the link manager 330 described below from text selected by the scanner 324 described above. In one embodiment, the markup text assembler 336 adds text in the form of hypertext markup language commands, or HTML commands. HTML commands are described in Ray Duncan, *An HTML Primer*, PC Magazine, Jun. 13, 1995 at 261 et. seq. In one embodiment, markup text assembler assembles markup commands corresponding to the selected text. The filename, column and line number selected by scanner 324 are assembled by markup text assembler 326 into markup reference 420.

The text within parentheses is parsed by the links manager 330 to determine the application and parameters to the application which will be used to link the application to the error message, as described below. In one embodiment, a lookup table 327 is used to match the portion of the text in error messages 212, 214 within parentheses and before the colon to the application to be used to provide the designated information. In one embodiment the word, 'help' in error messages 212, 214 is matched to the 'help viewer' application, described below. Parameters to be used by the matched application follow the colon. Markup text assembler 326 builds the markup reference 422 by adding the application name from lookup table 327 to a colon and the parameters, if any. Each reference 420, 422, 424, 426 is completed by markup text assembler by adding the characters '<A HREF=' to the beginning of each markup reference 420, 422, 424, 426 and the character '>' to the end of each markup reference 420, 422, 424, 426.

Markup inserter 328 inserts the markup references in appropriate positions within the error messages 212, 214. In one embodiment, markup reference 420 corresponding to the source code file is inserted in front of the error message, and markup reference 422 corresponding to parenthetical statements are inserted prior to the first parenthesis. In one embodiment, markup inserter 328 also inserts the characters '</A>' 430, 432, 434, 436 after the colon following the original position of the line number, and after each closing parenthesis following a parenthetical message, for use as described below. The characters </A> operate as end-of-link identifiers 430, 432, 434, 436. Filter 320 sends the completed messages 440, 444 to the filter output 329.

Figure 3A:
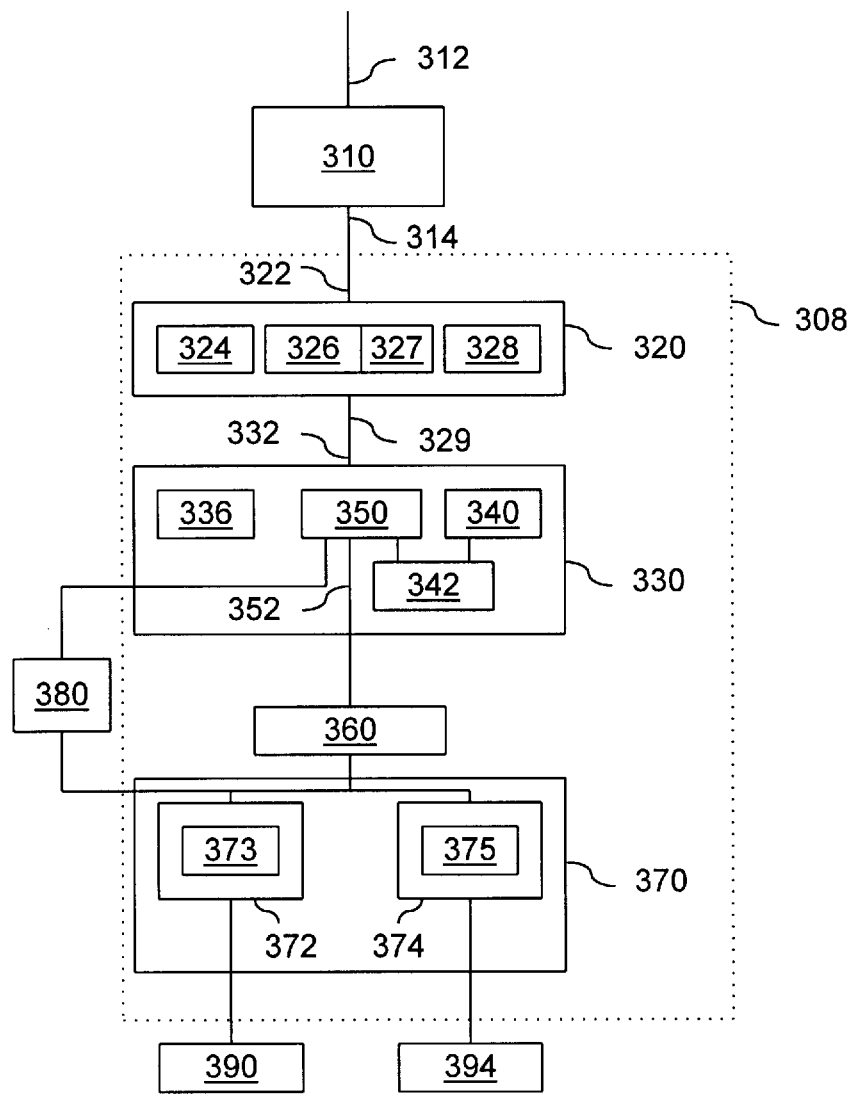
FIG. 3A is a block schematic diagram of an apparatus which relates relevant information to compiler error messages according to one embodiment of the present invention.
Figure 3B:
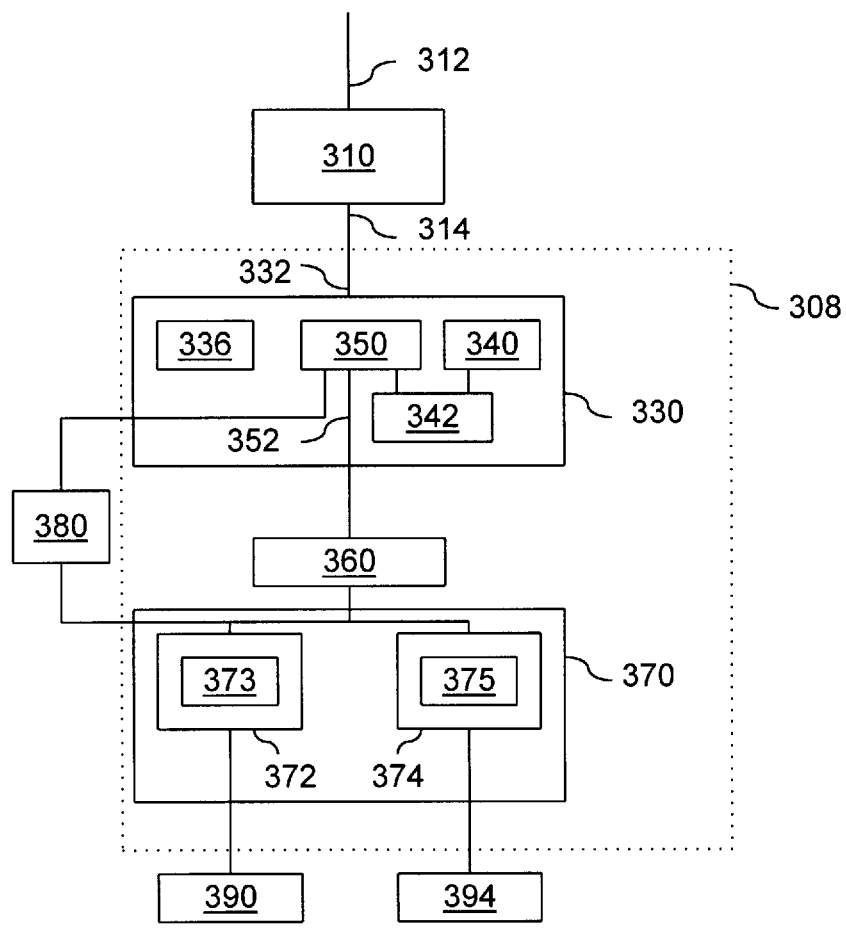
FIG. 3B is a block schematic diagram of an apparatus which relates relevant information to compiler error messages according to another embodiment of the present invention.

In one embodiment, compiler 310 generates completed messages 440, 444 and thus filter 320 is unnecessary. FIG. 3B illustrates this embodiment, and is similar to FIG. 3A except that the filter is not present and the compiler output 314 is coupled directly to the links manager 330, as described below.

Figure 5:
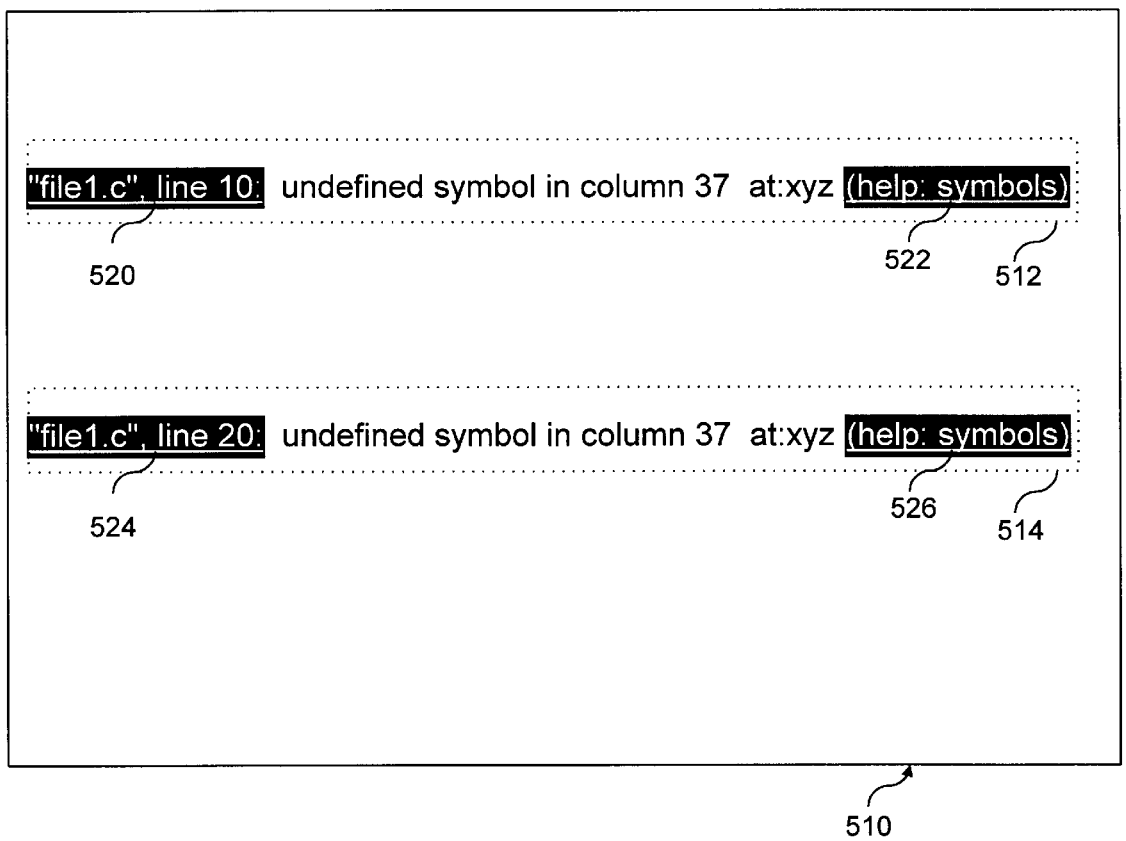
FIG. 5 is a pictorial illustration of a display screen showing visible and highlighted text of an error message display according to one embodiment of the present invention.

Referring now to FIGS. 2, 3A, 4 and 5, in one embodiment, filter output 329 is coupled to the input of links manager 330. Links manager 330 displays and allows the user to interact with links, or highlighted portions 520, 522, 524, 526 of the completed error messages 440, 444 which appear to the user similar to the original error messages 212, 214 with the addition of visual indicators such as highlighted portions 520, 522, 524, 526, or glyphs, which are small pictures. Links scanner 336 scans the text at the links manager input 332 and identifies any markup references 420, 422, 424, 426 and end-of-link identifiers 430, 432, 434, 436. In one embodiment, links renderer 340 displays the completed messages 412, 414 as a linked error message in which markup references 420, 422, 424, 426 are not displayed, and end-of-link identifiers 430, 432, 434, 436 are not displayed, and text 520, 522, 524, 526 between each markup reference 420, 422, 424, 426 and the following end-of-link identifier 430, 432, 434, 436 is highlighted in some fashion, such as by underlining, changing the background color, or both, as shown in FIG. 5. Additionally, or alternatively, a glyph may be displayed near the text 520, 522, 524, 526 to provide a visual indicator. The highlighted text 520, 522, 524, 526, the glyph or both are also known as links 520, 522, 524, 526, while the information pertaining to the link is known as link information 420, 422, 424, 426. The links renderer 340 also maintains a table of links positions 342 containing the screen coordinates of each link 520, 522, 524, 526. Links renderer 340 also displays a window 510 and allows the user to interact with the window 510 by responding to scrolling and other commands for the display of the error messages 512, 514 in the window 510.

Links activator 350 is coupled to receive mouse button and position messages from the operating system 380. When a mouse button down message is received by links activator 350, it identifies the location of the mouse using position messages from the operating system and determines if the mouse is positioned over a link 520, 522, 524, 526 using the table of links positions 342 described above.

If the user has pressed and released a mouse button while the mouse is positioned over a link 520, 522, 524, 526, the markup reference 420, 422, 424, 426 preceding the link 520, 522, 524, 526 is sent by links activator 350 via output 352 to address resolver 360 which separates the parameters of a multiple parameter markup reference such as the editor markup references 420, 424, determines the application 394 or editor 390 corresponding to the link and calls the module 372, 374 corresponding to the application or editor, sending the separated parameters as parameters to the modules 372, 374.

Each module 372, 374 in control manager 370 operates an application 394 or editor 390 based upon the link 520, 522, 524, 526 selected by the user as described above. In one embodiment, if address resolver 360 receives a markup reference 420, 424 corresponding to the line number of the compiler source file, address resolver 360 calls editor control module 372 to run the editor 390 if the editor 390 is not already running, load the source file if it is not already loaded, display the line number indicated in the markup reference 420, 424 and position the editor cursor at the column number indicated in the markup reference 420, 424 to the right of the period. Editor control module 372 assembles the proper commands and sends it to the operating system 380 to start the editor, or to the editor 390 to load the source file or position the cursor and display the desired line number. In one embodiment, the operating system 380 is the SPARCSystem operating system commercially available from Sun Microsystems, Inc. of Mountain View, Calif., and the operating system call to run the editor 390 execvp. In one embodiment, editor 390 is a conventional XEMACS editor, adapted as described below, and the commands to load a file and display a line number are eserve-load-file, and eserve-goto-lineno, respectively, implemented in XEMACS as described below. In one embodiment, the sequence listed in Appendix 1 is stored into a disk file in directory /home/user1/elisp, in the file ebo.el. The sequence is loaded into the conventional XEMACS editor to adapt it to perform the eserve-load-file, and eserve-goto-lineno commands using the following two XEMACS commands:

(setq load-path (append load-path '("/opt/SUNWspro/lib")))

(load "/home/user1/elisp/ebo.el")

In one embodiment, editor control module 372 maintains the status of the editor 390 in a status list 373 to allow for the determination of whether to start the editor or load the file based upon previous commands the editor control module 372 sent to the editor 390. If the editor 390 terminates without a command from the editor control module 372, editor control module 372 will update its status list 373 based upon operating system messages received when editor control module 372 next attempts to communicate with editor 390.

In one embodiment, if address resolver 360 receives a markup reference 422, 426 corresponding to the help viewer 394, address resolver 360 calls help control module 374 to run the help viewer 394 if not already running, and to display a portion of the help information indicated by the parameter sent from address resolver 360. Help control module 374 assembles and sends the command to the operating system 380 to load the help viewer 394 if necessary, and assembles and sends to the help viewer 394 the command to display the information as indicated by the parameter received from the address resolver 360, as described above. In one embodiment, the operating system 380 is the conventional SPARCSystem operating system commercially available from Sum Microsystems, Inc., of Mountain View, Calif., the help viewer is a dynamically loaded shared library, such as libDtHelp.so contained in CDE 1.0 available from Sun Microsystems of Mountain View, Calif. and the command to load the help viewer 394 is dlopen("libDtHelp.so.1", RTLD_LAZY). In such an embodiment, subsequent commands used to direct the help viewer 394 to display help information are made using function calls to the shared library, such as the libDtHelp.so void function HelpOnTopic, containing the parameters "parent" of type Widget, containing a handle to the help control module 374 and "clientdata" containing a pointer to a text string containing the keyword from which to locate the help information. In help messages 512, 514 the keyword is located to the right of the colon in text 522, 526 and is "symbols".

Figure 6:
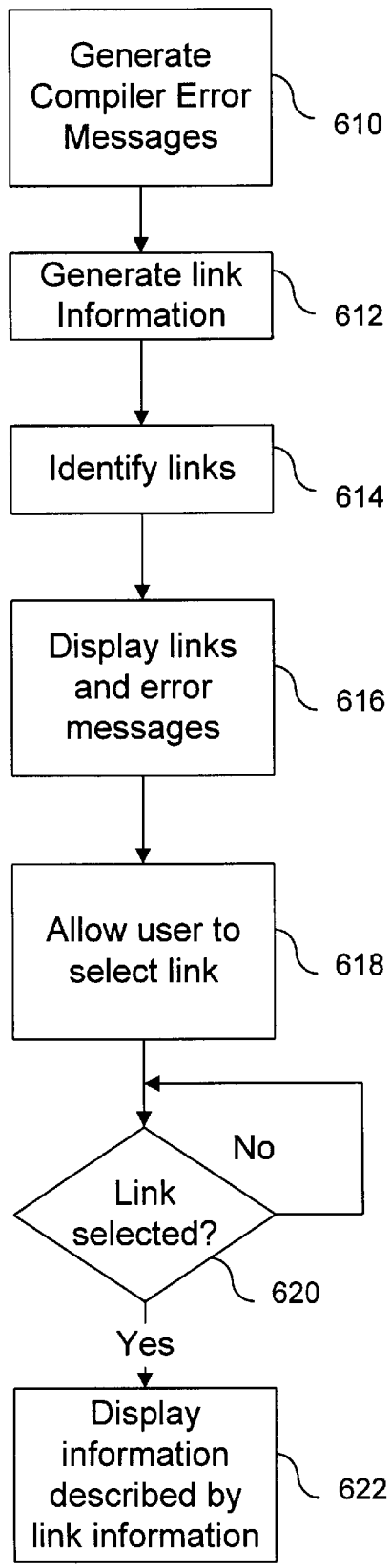
FIG. 6 is a flowchart illustrating a method of associating relevant information with compiler error messages according to one embodiment of the present invention.

Referring now to FIG. 6, one embodiment of a method of linking compiler error messages to relevant information is shown. Compiler error messages and link information are generated 610, 612. The link information may be generated after all of the compiler errors are generated or may be generated simultaneously with the generation of the compiler errors. In one embodiment, error messages are codes, and in another embodiment, error messages contain explanatory text as described above. In one embodiment the link information includes identifiers for an application, or identifiers for information such as source code file name, line numbers and column numbers, or help file indices.

Links are identified and displayed along with the error messages 614, 616. In one embodiment, links are displayed by highlighting a portion of the error messages corresponding to the link, although in other embodiments, any displayed indicator of the link is sufficient. The user is allowed to select a link 618, and if selected 620, the information described by the link information is displayed 622.

Figure 7:
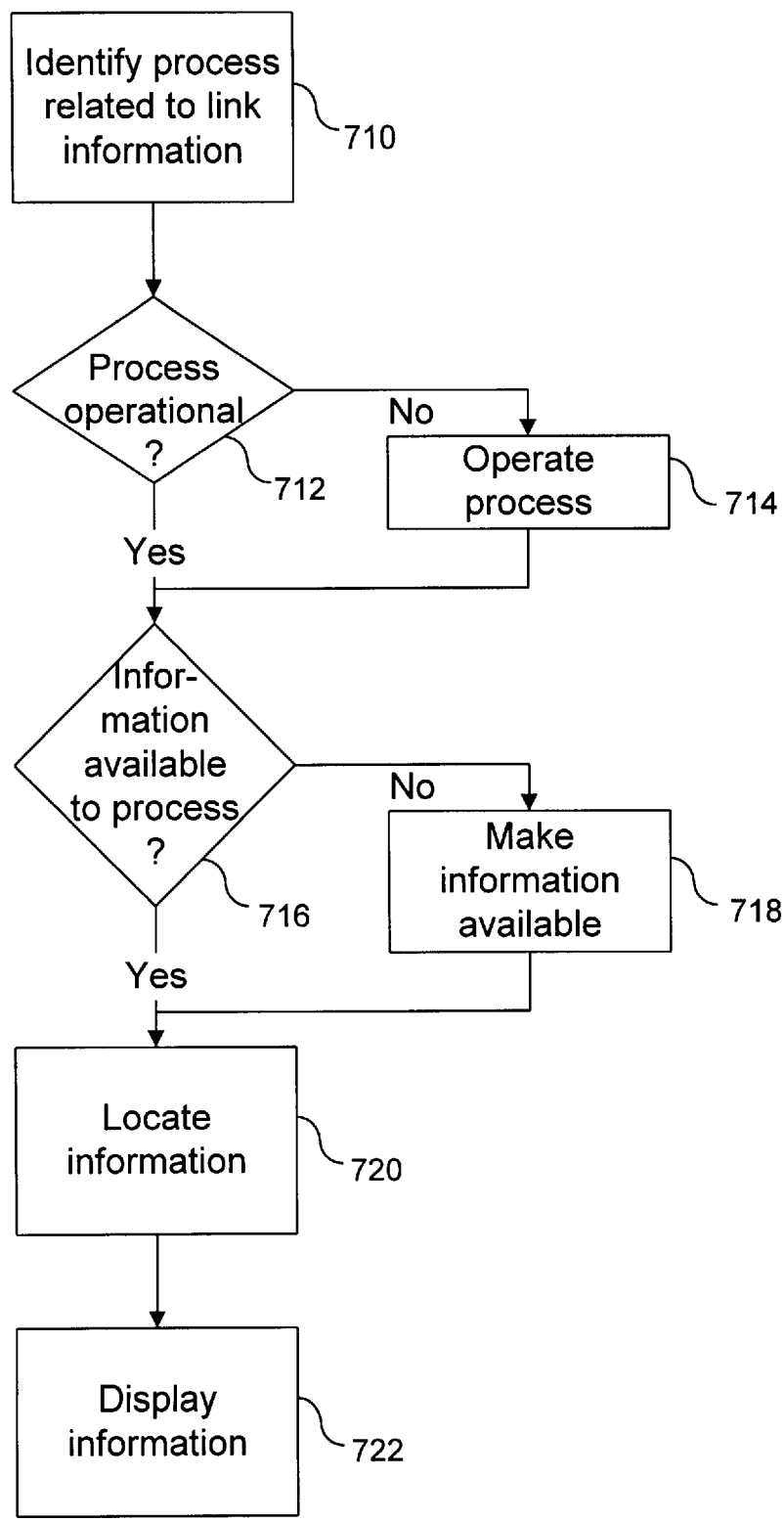
FIG. 7 is a flowchart of a method displaying information described by link information according to one embodiment of the present invention.

Referring now to FIG. 7, one embodiment of a method of displaying information described by link information is shown. A process related to the link information is identified from the link information 710. In one embodiment, processes include an editor and a help viewer. If the process is not operational, it is made operational 712, 714. If the information specified by the link information is not available to the process, such information is made available to the process 716, 718. In one embodiment, the information is located in a file, which is unavailable if the file is not opened by the process, and made available by generating and sending a command to the process to open the file. At least a part of the information specified by the link information is located and displayed 720, 722.

Figure 8:
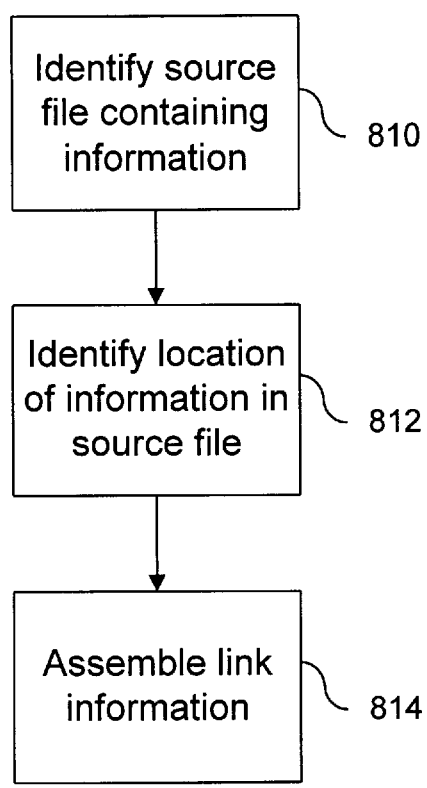
FIG. 8 is a flowchart illustrating a method of generating link information from a compiler error message according to one embodiment of the present invention.

Referring now to FIG. 8, a method of generating link information from the compiler error message is shown. The name of a source file and location of certain information in the source file is identified from the compiler error message 810, 812, and the link information is assembled 814. In one embodiment, the name of the source file is inferred from the name of an application.

Appendix 1

```
;; eserve.el --- Implements Emacs side of ESERVE-Emacs_interface.

;; Copyright (C) 09 Jun 1995  Sun Microsystems, Inc.

;; Created:    July 1994
```

```
;; Version:    1.68

;; Header:     @(#) eserve.el: v1.68 95/06/09 17:20:30

;; Keywords:   ESERVE GNU Emacs XEmacs integation

;;; To Do:

;; Replace use of after-change-function with after-change-functions

;;
;; User settable variables
;;

;; NOTE: If the user would rather the fkeys be left alone,

;; then the variable eserve-bind-fkeys should be set to nil (before

;; emacs connects to the application)

;;

(defvar eserve-bind-fkeys t "if t, adds bindings for function
keys")

;;
;; %%%%%%%%%%%%%%%%%%%%% user section ends %%%%%%%%%%%%%%%%%%%
;;

(require 'cl)                              ;Common Lisp compatibility
```

```
;;
;; Global variables
;;
;; Create and initialize global variables
;;

(defvar eserve-connection nil "ESERVE process object")

(defvar eserve-app-name nil "name of application attached to
emacs")

(defvar eserve-protocol-version 2 "Version of the_protocol to
ESERVE")

;; Determine whether we are running GNU Emacs v19 or XEmacs.

(defvar running-xemacs nil "t if we're running XEmacs")

(defvar running-emacs  nil "t if we're running GNU Emacs 19")

(if (string-match "^19\..*\\(XEmacs\\|Lucid\\)" emacs-version)

(setq running-xemacs t)

(setq running-emacs   t))

;; We need to use prime numbers here (e.g. 127, 509, ...) to reduce
the likeli-

;; hood of collisions.

(defvar eserve-buffers-marks-size 127 "Initial size of buffers-mark
vectors list")

(defvar eserve-mark-vector-chunk  127 "Size of eserve-mark-vector
chunk")

(defvar eserve-buffers-marks-list (make-hash-table :test 'eq :size eserve-buffers-marks-size)
```

"Hash table containing buffers and their associated mark vectors")

(defvar eserve-message-leftover nil "contains partial message saved across buffer sends from eserve")

(defvar eserve-mark-type-list nil "the list of mark types which describe the visible properties of a mark")

(defvar eserve-current-toolbar nil "The current ESERVE toolbar")

(defvar eserve-toolbar-icon-height 25 "height of toolbar icons")

(defvar eserve-frame-previous-toolbar-alist nil "list of frames and toolbar info")

(defvar eserve-toolbar-table nil

"A vector of vectors which holds the descriptions of toolbar items.

Each toolbar items comprises 0  file..........(string) the pixmap filename 1  verb..........(string) the verb (action) to be performed 2  help..........(string) the help text to display when over the icon 3  needsFilePos..(boolean) indicates if file position should also be sent with the verb 4  offset........(integer) the spacing (in pixels) to the previous icon or edge. This is treated as a hint by Emacs and may be rounded up or down modulo pixels/default-character-width.

5 label.........(string) a label to use if an icon can't be created.")

(defvar eserve-fkey-functions nil
  "list of name of applications binding fkeys")

(defvar eserve-startup-file nil "file contains code to connect app/emacs")

(defvar eserve-startup-envvar "SPRO_EDITOR_RENDEZVOUS_FILE" "env var whose value indicates the startup file")

(defvar eserve-menus nil "list of app-defined menus")

(defvar eserve-verb-hash-size 127 "initial size of eserve-verb-button-hash table")

(defvar eserve-verb-button-hash
  (make-hash-table :test 'equal :size eserve-verb-hash-size)
  "Hash table containing verb strings and their associated buttons")

(defvar eserve-vc-next-op-item nil "holds VC next_operation menu item")

(defvar eserve-vc-teardown-menu nil "if t, tear down VC menu at cleanup time")

;;

```
;; Debugging and tracing

;;

(defvar eserve-log-buffer nil "log for eserve/emacs message
traffic")

(cond ((getenv "HB_DEBUG")

(setq debug-on-error t)

(setq eserve-log-buffer (get-buffer-create " *eserve-log*"))))

(defun eserve-log-text (string)

(cond ((and eserve-log-buffer (buffer-name eserve-log-buffer))

(save-excursion (set-buffer eserve-log-buffer)

(goto-char (point-max))

(insert string)))))

;;

;; eserve initialization

;;

(defun eserve-init ()

"Initializes Emacs for communication with ESERVE.  This function
is called from the command line which invokes Emacs."

(eserve-log-text (format "%s started.\n" emacs-version))
```

```
   (eserve-log-text (format "%s\n" command-line-args))

;; GNU Emacs 19 - XEmacs compatibility (unless (fboundp 'raise-frame) (fset 'raise-frame 'raise-screen))

(unless (fboundp 'window-frame) (fset 'window-frame 'window-
screen))

;; Choose the correct overlay-or-extent creation & deletion
functions.

(when running-xemacs (defalias 'eserve-vc-setup 'eserve-xemacs-vc-setup)

(defalias 'eserve-vc-cleanup 'eserve-xemacs-vc-cleanup)

(defalias 'eserve-add-menus 'eserve-xemacs-add-menus)

(defalias 'eserve-delete-menus 'eserve-xemacs-delete-menus)

(defalias 'eserve-create-overlay-or-extent 'eserve-xemacs-
create-extent)

(defalias 'eserve-delete-overlay-or-extent 'eserve-xemacs-
delete-extent)

(defalias 'eserve-set-overlay-or-extent    'eserve-xemacs-set-
extent))

(when running-emacs (defalias 'eserve-vc-setup 'eserve-emacs-vc-setup)

(defalias 'eserve-vc-cleanup 'eserve-emacs-vc-cleanup)

(defalias 'eserve-add-menus 'eserve-emacs-add-menus)

(defalias 'eserve-delete-menus 'eserve-emacs-delete-menus)

(defalias 'eserve-create-overlay-or-extent 'eserve-emacs-
create-overlay)

(defalias 'eserve-delete-overlay-or-extent 'eserve-emacs-
delete-overlay)
```

```
   (defalias 'eserve-set-overlay-or-extent    'eserve-emacs-set-
overlay))

;; Make the function which is run after a change in a buffer
local to that

;; buffer.

(make-variable-buffer-local 'after-change-function) ;TBD:
Obsolete

;; Create a new face with which to highlight errors, etc.

(copy-face 'default 'eserve-highlight)

(eserve-xpm-setup)

(eserve-vc-setup)

;; load startup file if it exists (let ((startup-file nil))
     (cond
      ((setq eserve-startup-file (getenv eserve-startup-envvar))
       (eserve-load-startup-file)
       (setenv eserve-startup-envvar nil)))))

;;
;; eserve process communication functions
;;

(defun eserve-connection-filter (process output)
```

```
   "Handles output from eserve process."
   (set-process-filter eserve-connection t)
   (unwind-protect
       (condition-case err-msg
         (progn
           (eserve-log-text (format "%s" output))
           (eserve-eval-cmds output))
       (error
         (progn
           (message (format "Error: %s - occurred during eserve msg
evaluation" err-msg))
           (eserve-log-text (format "Error: %s - occurred during
eserve msg evaluation\n" err-msg)))))
     (set-process-filter eserve-connection 'eserve-connection-
filter))
   (set-process-filter eserve-connection 'eserve-connection-filter))

(defun eserve-connection-sentinel (process status)
   "Handles changes in status to ESERVE process."
   (cond
    ((memq (process-status process) '(signal exit closed))
     (cond
      (eserve-app-name
       (message (format "connection to %s terminated" eserve-app-
name)))
      (t
       (message "connection to eserve termintated")))
```

```
    (eserve-connection-cleanup))))

(defun eserve-connection-cleanup ()
  "Cleans up after ESERVE connection is broken"
  (eserve-cleanup)
  (setq eserve-connection nil))

(defun eserve-cleanup ()
  "Cleans up ESERVE related information"
  (eserve-clear-all-marks)
  (remove-hook 'kill-buffer-hook 'eserve-kill-buffer-hook)
  (remove-hook 'find-file-hooks 'eserve-find-file-hook)
  (remove-hook 'after-save-hook 'eserve-after-save-hook)
  (remove-hook 'first-change-hook 'eserve-first-change-hook)
  (clrhash eserve-buffers-marks-list)
  (setq eserve-mark-type-list nil)
  (setq eserve-message-leftover nil)
  (setq eserve-app-name nil)
  (eserve-delete-menus eserve-menus)
  (clrhash eserve-verb-button-hash)
  (eserve-xpm-cleanup)
  (eserve-toolbar-cleanup)
  (eserve-vc-cleanup)
  (cond
    (running-emacs ;; menu removal bug
```

```
    (redraw-display))))

(defun eserve-quit ()
  "aborts currently launching application and disconnects from it"
  (eserve-launch-timer-reset)
  (cond
   (eserve-launch-process
    (delete-process eserve-launch-process)
    (eserve-launch-process-cleanup)))
  (cond
   (eserve-connection
    (delete-process eserve-connection)))
  (eserve-connection-cleanup))

(defun eserve-xpm-setup ()
  "sets up the xpm-color-symbols list"
  (when running-xemacs
    (cond
     ((not (assoc "FgColor" xpm-color-symbols))
      (setq xpm-color-symbols
            (append (list
                    '("FgColor" (face-foreground 'default))
                    '("BgColor" (face-background 'default)))
                   xpm-color-symbols))))))
```

```
(defun eserve-xpm-cleanup ()

"restores the xpm-color-symbols list"

(cond (running-xemacs (let ((bg-color-attr (assoc "BgColor" xpm-color-symbols))

(fg-color-attr (assoc "FgColor" xpm-color-symbols)))

(cond (bg-color-attr (setq xpm-color-symbols (delq bg-color-attr xpm-color-symbols))))

(cond (fg-color-attr (setq xpm-color-symbols (delq fg-color-attr xpm-color-symbols)))))))

(defun eserve-toolbar-cleanup ()

"restores emacs to the pre-eserve-toolbar state"

(cond (running-xemacs (cond (eserve-use-bb-toolbar ;; - 19.11

(cond ((fboundp 'toolbar)

(toolbar 0)))) ;hide the ESERVE toolbar window (t
```

```
      (mapcar '(lambda (tb-info) (eserve-restore-frame-toolbar tb-
info))
           eserve-frame-previous-toolbar-alist)
      (setq eserve-frame-previous-toolbar-alist nil)))
      (setq eserve-current-toolbar nil))))

(defun eserve-eval-cmds (msgs)
   "reads and evaluates commands from eserve message stream"
   (let ((current-cmd-str nil)
         (current-cmd nil)
         (cmd-front 0)
         (index 0)
         (cmds nil)
         (cmds-len 0))
     (cond
      (eserve-message-leftover
        (setq cmds (concat eserve-message-leftover msgs))
        (setq eserve-message-leftover nil))
      (t
        (setq cmds (concat msgs))))
      (setq eserve-message-buffer nil)
      (setq cmds-len (length cmds))
      (while (< index cmds-len)
        ;; find a command
        (setq cmd-front index)
        (while (and (< index cmds-len)
```

```
                    (not (char-equal (aref cmds index) ?\n)))
        (setq index (+ index 1)))
     ;; check for message been split across buffers
     (cond
      ((and
        (>= index cmds-len)
        (not (char-equal (aref cmds (- index 1)) ?\n)))
       (setq eserve-message-leftover (substring cmds cmd-front
index)))
      (t
       (setq current-cmd-str (substring cmds cmd-front index))
       (setq current-cmd (read-from-string current-cmd-str))
       (eval (car current-cmd))
       ;; go past newline
       (setq index (+ index 1))))))
)

(defun eserve-set-app-name (app-name)
  "Set the name of the app connected to eserve"
  (setq eserve-app-name app-name))

(defun eserve-connect (eserve-portnum)
  "Connects to the ESERVE process"
  (condition-case err-msg
      (progn
       (cond
```

```
      ((not eserve-app-name)
       (setq eserve-app-name "eserve")))
      (setq eserve-connection (open-network-stream "eserve
connection"
                                                    nil
                                                    "localhost"
                                                    eserve-portnum))
      (set-process-filter eserve-connection 'eserve-connection-
filter)
      (set-process-sentinel eserve-connection 'eserve-connection-
sentinel)
      (eserve-event-connected)
      (add-hook 'kill-buffer-hook 'eserve-kill-buffer-hook)
    (add-hook 'find-file-hooks 'eserve-find-file-hook)
      (add-hook 'after-save-hook 'eserve-after-save-hook)
      (add-hook 'first-change-hook 'eserve-first-change-hook)
    (cond
     (eserve-bind-fkeys
      (eserve-init-fkey-functions))))
     (error (message "%s: Could not connect to %s: Please fix and
retry."
                      err-msg eserve-app-name))))

(defun eserve-load-startup-file ()
  "loads the file containing code to start the connection between
eserve/emacs"
  (cond
   ((and eserve-startup-file
```

```
      (stringp eserve-startup-file)

(> (length eserve-startup-file) 0))

(cond ((file-exists-p eserve-startup-file)

(load eserve-startup-file)

(delete-file eserve-startup-file)))

(setq eserve-startup-file nil))))

(defun eserve-process-send-string (process str)

"send STR to the eserve process over the connection to eserve"

(cond (process (process-send-string process str))))

(defun eserve-send-verb (verb &optional needsFilePos)

"send a tool verb to ESERVE"

(cond (eserve-connection (let ((file-name (buffer-file-name (current-buffer)))

(current-line (eserve-cursor-line))

(current-col (eserve-cursor-column))

(selection (eserve-current-selection))

(message-str nil))

(if (not selection)

(setq selection ""))
```

```
        (if (not file-name)
         (setq file-name "NULL"))
        (setq message-str
            (format "toolVerb %s %s %d,%d -1,-1 -1,-1 %d %s\n"
                verb file-name
                (+ current-line 1)
                (+ current-col 1)
                (length selection) selection))
        (eserve-log-text (format "(%s)\n" message-str))
        (eserve-process-send-string eserve-connection message-
str))))

(defun eserve-send-ack (ack-num)
  "send an ack to ESERVE"
  (let ((ack (format "ack %d\n" ack-num)))
    (eserve-log-text (format "(%s)\n" ack))
    (eserve-process-send-string eserve-connection ack)))

;;
;; functions to invoke eserve from emacs
;;

(defvar eserve-launch-process nil)
(defvar eserve-launch-timer-max 180)
(defvar eserve-launch-timer-increment 5)
(defvar eserve-launch-timer-process nil)
```

```
(defvar eserve-launch-current-time 0)
(defvar eserve-launch-abort nil)

(defun eserve-app-start (app-name)
  "invokes an application from emacs"
  (cond
    ((not (stringp app-name))
     (message "No application name specified")
     nil)
    ((or eserve-connection eserve-launch-process)
     (message "Already connected, please exit application")
     nil)
    (t
     (setq eserve-app-name app-name)
     (eserve-init)
     (eserve-launch-app)
     t)))

(defun eserve-launch-timer-sentinel (proc str)
  (let ((stat (process-status proc)))
    (cond
      ((memq stat '(exit signal))
       (setq eserve-launch-timer-process nil)
       (eserve-launch-timer-timeout)))))
```

```
(defun eserve-launch-timer-reset ()
  (setq eserve-launch-current-time 0)
  (cond
    (eserve-launch-timer-process
      (setq eserve-launch-abort t)
      (eserve-kill-launch-timer))))

(defun eserve-kill-launch-timer ()
  (cond ((and eserve-launch-timer-process
              (eq (process-status eserve-launch-timer-process) 'run))
         (delete-process eserve-launch-timer-process)))
  (setq eserve-launch-timer-process nil))

(defun eserve-setup-launch-timer ()
  (setq eserve-launch-timer-process
        (start-process "launch timer process" nil "sleep"
                       (int-to-string eserve-launch-timer-increment)))
  (set-process-sentinel eserve-launch-timer-process 'eserve-launch-timer-sentinel))

(defun eserve-launch-timer-timeout ()
  (let ((startup-file-exists (file-readable-p eserve-startup-file)))
    (setq eserve-launch-current-time
          (+ eserve-launch-current-time eserve-launch-timer-increment))
    (cond
```

```
     (eserve-launch-abort (message "Connection aborted.")

(setq eserve-launch-abort nil))

(startup-file-exists (eserve-load-startup-file)

(eserve-launch-timer-reset)

(message (format "Connection to %s established" eserve-app-
name)))

((>= eserve-launch-current-time eserve-launch-timer-max)

(eserve-launch-timer-reset)

(message (format "Error: Could not connect to %s" eserve-app-
name)))

(t (message (format "Waiting for %s to connect..." eserve-app-
name))

(eserve-setup-launch-timer)))))

(defun eserve-launch-app ()

(setq eserve-startup-file (make-temp-name "/tmp/emacs"))

(setenv "SPRO_EDITOR_RENDEZVOUS_FILE" eserve-startup-file)

(condition-case err-msg (progn (setq eserve-launch-process (start-process "eserve launch" nil
eserve-app-name))

(message (format "Waiting for %s to connect..." eserve-app-
name)))

(file-error
```

```
      (message
        (format "Could not find %s, please check your PATH variable"
           eserve-app-name))))
  (setenv "SPRO_EDITOR_RENDEZVOUS_FILE" nil)
  (cond
   (eserve-launch-process
     (eserve-setup-launch-timer)
     (set-process-sentinel eserve-launch-process 'eserve-launch-
process-sentinel))))

(defun eserve-launch-process-cleanup ()
  "Cleans up after ESERVE process has terminated"
  (setq eserve-launch-process nil))

(defun eserve-launch-process-sentinel (process status)
  "Handles changes in status to ESERVE process."
  (cond
    ((memq (process-status process) '(signal exit closed))
;;   (message (format "%s has terminated" eserve-app-name))
     (eserve-launch-process-cleanup))))

;;
;; eserve protocol functions for file and marker management
;;

(defun eserve-quit-emacs ()
```

```
  "brings down emacs on behalf of eserve"
  (kill-emacs))

(defun eserve-load-file (file-to-load)
  "loads a file into a buffer on behalf of eserve"
  (let ((file-buffer (eserve-file-to-buffer file-to-load)))
    (cond
      ((not file-buffer)
       (cond
     ((file-exists-p file-to-load)
      (setq file-buffer (find-file file-to-load)))
     (t
      (setq file-buffer (switch-to-buffer
                 (create-file-buffer file-to-load)))))))
    (message "")
    (eserve-show-buffer file-buffer)))

(defun eserve-save-file (file-to-save)
  "saves a file on behalf of eserve"
  (let ((file-buffer (eserve-file-to-buffer file-to-save)))
    (cond
      (file-buffer
       (save-excursion
     (set-buffer file-buffer)
     (save-buffer))
```

```
        (message "")))))

(defun eserve-front-file (file-to-front)

"switches a buffer, and raises its window to the front on behalf
of eserve"

(let ((file-buffer (eserve-file-to-buffer file-to-front)))

(cond (file-buffer (switch-to-buffer file-buffer)

(eserve-raise-buffer file-buffer)))))

(defun eserve-show-file (file-to-show)

"switches a buffer to the front on behalf of eserve"

(let ((file-buffer (eserve-file-to-buffer file-to-show)))

(eserve-show-buffer file-buffer)))

(defun eserve-set-mark (file-name line-num mark-id mark-type)

"creates a mark in file-name at line line-num of type mark-type"

(let ((file-buffer (eserve-file-to-buffer-create file-name)))

(if file-buffer (let ((eserve-mark (eserve-make-eserve-mark file-buffer
line-num mark-id mark-type)))

(eserve-add-mark eserve-mark)

(if (/= mark-type 0)

(eserve-mark-change-mark-type eserve-mark mark-
type))))))
```

```
(defun eserve-delete-mark (file-name mark-id)
  "deletes a MARKID from FILENAME"
  (let ((file-buffer (eserve-file-to-buffer-create file-name)))
    (if file-buffer
        (eserve-remove-mark file-buffer mark-id))))

(defun eserve-goto-mark (file-name mark-id msg)
  "warps to the mark associated with MARKID in FILENAME showing
MSG"
  (let ((file-buffer (eserve-file-to-buffer file-name)))
    (if file-buffer
        (let ((eserve-mark (eserve-get-mark file-buffer mark-id))
              (emark nil))
          (setq emark (eserve-mark-mark eserve-mark))
          (goto-char (marker-position emark))
        (switch-to-buffer file-buffer)
        (cond
         ((> (length msg) 0)
          (message "")
          (princ msg t)))))))

(defun eserve-goto-line (file-name line-num)
  "warps to LINENUM in FILENAME"
  (let ((file-buffer (eserve-file-to-buffer file-name)))
    (if file-buffer
        (let ((pos (eserve-line-to-pos file-buffer line-num)))
```

```
          (goto-char pos)

(switch-to-buffer file-buffer)))))

(defun eserve-get-mark-type (pos mark-type-list)

;; Return the mark-type in position POS in MARK-TYPE-LIST.

(aref mark-type-list pos))

(defun eserve-change-mark-type (file-name mark-id new-type)

;; Change in FILE NAME the type of mark MARK ID to NEW TYPE.

(let ((eserve-mark (eserve-get-mark (eserve-file-to-buffer file-
name) mark-id)))

(eserve-mark-change-mark-type eserve-mark new-type)))

(defun eserve-set-mark-type-list (mark-type-list)

;; Set eserve-mark-type-list to MARK TYPE LIST and perform any
needed

;; initializations.  Return TBD if successful or signal an error.

(cond

;; Sanity checks ...

((not (vectorp mark-type-list)) (signal 'wrong-type-argument
'()))

;; ... passed.

(t (setq eserve-mark-type-list mark-type-list)

(eserve-init-mark-types mark-type-list))))
```

```
;;;
;;; protocol support functions
;;;

(defun eserve-add-mark (eserve-mark)
  ;; Add a mark to the list of marks for the corresponding buffer.
  (let ((buff (eserve-mark-buffer eserve-mark))
        (mark-list nil)
        (mark-id (eserve-mark-id eserve-mark)))
    (setq mark-list (eserve-get-buffer-marks buff))
    (cond
     ((not mark-list)
      (setq mark-list (eserve-create-buffer-marks buff))))
    (cond
     ((>= mark-id (length mark-list))
      (setq mark-list (eserve-grow-vector mark-list mark-id eserve-mark-vector-chunk))
      (eserve-set-buffer-marks buff mark-list)))
    ;; check for old mark not deleted
    (let ((old-mark (aref mark-list mark-id)))
      (cond
       (old-mark
        (eserve-mark-clear-renderer old-mark))))
    (aset mark-list mark-id eserve-mark)))

(defun eserve-remove-mark (file-buffer mark-id)
```

"removes mark corresponding to MARKID from FILEBUFFER's list of marks"
```
  (let ((mark-list (eserve-get-buffer-marks file-buffer)))
    (cond
     (mark-list
      (let ((eserve-mark (aref mark-list mark-id)))
        (cond
         (eserve-mark
          (eserve-mark-clear-renderer eserve-mark)
          (aset mark-list mark-id nil)))))))))

(defun eserve-get-mark (file-buffer mark-id)
  "returns the eservemark associated with MARKID and BUFFER"
  (let ((mark-list (eserve-get-buffer-marks file-buffer))
        (list-size 0))
    (setq list-size (length mark-list))
    (cond
     ((< mark-id list-size)
      (aref mark-list mark-id))
     (t nil))))

(defun eserve-get-buffer-marks (file-buffer)
  "returns the marks associated with BUFFER"
  (cl-gethash file-buffer eserve-buffers-marks-list))

(defun eserve-set-buffer-marks (file-buffer mark-list)
```

```
  "associates MARKLIST with BUFFER"
  (cl-puthash file-buffer mark-list eserve-buffers-marks-list))

(defun eserve-delete-buffer-marks (file-buffer)
  "dis-associates MARKLIST with BUFFER, deletes buffer from list"
  (cl-remhash file-buffer eserve-buffers-marks-list))

(defun eserve-create-buffer-marks (file-buffer)
  "creates a marks list and associates it with BUFFER, RETURNS mark list"
  (let ((mark-list (make-vector eserve-mark-vector-chunk nil)))
    (eserve-set-buffer-marks file-buffer mark-list)
    mark-list))

(defun eserve-grow-vector (vector-to-grow max-index chunk-size)
  "extend LIST TO GROW to contain MAX INDEX, RETURN new VECTOR"
  (let ((new-size (* chunk-size
                     (+ (/ max-index chunk-size) 1)))
        (size-diff 0)
        (new-vector nil))
    (setq size-diff (- new-size (length vector-to-grow)))
    (setq new-vector (vconcat vector-to-grow (make-vector size-diff nil)))))

(defun eserve-mark-change-mark-type (eserve-mark mark-type-index)
  ;; Change ESERVE MARK to NEW MARK TYPE
```

```
   (save-excursion
      (set-buffer (eserve-mark-buffer eserve-mark))
      (goto-char (marker-position (eserve-mark-mark eserve-mark)))
      (let
           ((new-mark-type (eserve-get-mark-type mark-type-index
eserve-mark-type-list))
            (beg-point (progn (beginning-of-line) (point)))
            (end-point (progn (end-of-line) (point))))
        ;; clear out old visual if it exists
        (eserve-mark-clear-renderer eserve-mark)
        (if (eserve-mark-type-face new-mark-type)
          (eserve-set-mark-renderer
             eserve-mark (eserve-create-overlay-or-extent
                  new-mark-type beg-point end-point))))))

(defun eserve-mark-clear-renderer (eserve-mark)
   ;; remove visual remains of ESERVE MARK
   (if eserve-mark
        (let ((old-renderer (eserve-mark-renderer eserve-mark)))
          (if old-renderer
             (save-excursion
                (set-buffer (eserve-mark-buffer eserve-mark))
                (eserve-delete-overlay-or-extent old-renderer)
                (eserve-set-mark-renderer eserve-mark nil))))))

(defun eserve-clear-buffer-marks (buff marks-list)
```

```
    "clears visuals for all ESERVE marks in the given buffer"
    (cond
     ((and buff marks-list)
      (mapcar 'eserve-mark-clear-renderer marks-list))))

(defun eserve-clear-all-marks ()
  "removes visuals backing all ESERVE marks in all buffers"
  (cond
   (eserve-buffers-marks-list
    (maphash 'eserve-clear-buffer-marks eserve-buffers-marks-
list))))

;;
;; editor state message functions
;;

(defun eserve-get-cursor-row-text ()
   "Send the text of the line the cursor is on to ESERVE"
   (save-excursion
    (let ((beg (progn (beginning-of-line) (point)))
          (end (progn (end-of-line) (point)))
          (message-string nil)
          (row-text-str nil))
       (setq row-text-str (buffer-substring beg end))
       (setq message-string (format "cursorRowText %d %s\n"
                          (length row-text-str)
```

```
                    row-text-str))

(eserve-process-send-string eserve-connection message-
string))))

(defun eserve-get-cursor-row ()

"Send the row number of the line the cursor is on to ESERVE"

(save-excursion (let ((row-num (eserve-cursor-line))

(message-string nil))

(setq message-string (format "cursorRow %d\n" row-num))

(eserve-process-send-string eserve-connection message-
string))))

(defun eserve-get-cursor-col ()

"Send the column number of the cursor on the line the cursor is
on to ESERVE"

(save-excursion (let ((col-num (current-column))

(message-string nil))

(setq message-string (format "cursorCol %d\n" col-num))

(eserve-process-send-string eserve-connection message-
string))))

(defun eserve-get-selected-text ()

"Send the text of the current selection on to ESERVE"

(save-excursion (let ((sel-text (eserve-get-selection))
```

```
      (sel-text-length 0)

(message-string nil))

(if (not sel-text)

(setq sel-text ""))

(setq sel-text-length (length sel-text))

(setq message-string (format "selectedText %d %s\n"
                   sel-text-length sel-text)))

(eserve-process-send-string eserve-connection message-string)))

;;
;; eserve-mark object functions
;;

;;
;; an eservemark object has the form:
;;     [eservemark MARK-ID MARK-TYPE MARK RENDER]
;;
;;   'eservemark   : symbol, identifies this vector as_an eserve-mark
;;    mark-id   : integer, used by ESERVE
;;    mark-type : integer, index into the vector eserve-mark-type-list
;;    mark      : mark, the mark itself
;;    renderer  : overlay or extent (defun eserve-markp (x)
```

```
  "returns t if x is an eservemark"
  (and (vectorp x) (= (length x) 5) (eq (aref x 0) 'eservemark)))

(defun eserve-mark-id (eservemark)
  "returns the id of an eservemark"
  (aref eservemark 1))

(defun eserve-mark-type (eservemark)
  "returns the type of an eservemark"
  (aref eservemark 2))

(defun eserve-mark-mark (eservemark)
  "returns the emacs mark for an eservemark"
  (aref eservemark 3))

(defun eserve-mark-renderer (eservemark)
  "returns the overlay or extent of an eservemark"
  (aref eservemark 4))

(defun eserve-mark-buffer (eservemark)
  "returns the buffer of an eservemark"
  (marker-buffer (eserve-mark-mark eservemark)))

(defun eserve-set-mark-id (eservemark new-id)
  "sets the id of an eservemark"
```

```
    (aset eservemark 1 new-id))

(defun eserve-set-mark-type (eservemark new-type)
  "sets the type of an eservemark"
  (aset eservemark 2 new-type))

(defun eserve-set-mark-mark (eservemark new-mark)
  "sets the emacs mark for an eservemark"
  (aset eservemark 3 new-mark))

(defun eserve-set-mark-renderer (eservemark new-renderer)
  "sets the emacs overlay or extent for an eservemark"
  (aset eservemark 4 new-renderer))

(defun eserve-make-eserve-mark (file-buffer line-num mark-id mark-type)
  "creates an eservemark object at line line-num in_buffer file-buffer"
  (let ((eservemark (make-vector 5 nil))
        (emark (make-marker))
        (buffpos (eserve-line-to-pos file-buffer line-num)))
    (aset eservemark 0 'eservemark)
    (eserve-set-mark-id eservemark mark-id)
    (eserve-set-mark-type eservemark mark-type)
    (eserve-set-mark-mark eservemark emark)
```

```
        (set-marker emark buffpos file-buffer)

(eserve-set-mark-renderer eservemark nil)

eservemark))

;;

;; eserve-mark-type object functions

;;

;;

;; an eserve-mark-type object has the form

;;    [fgColor bgColor glyphfile glyph face]

;;

;;   fgColor   : string  the foreground color of the mark

;;   bgColor   : string  the background color of the mark

;;   glyphFile : string  the pathname of the XPM/XBM glyph of this
mark

;;   glyph     : gylph   the gylph itself

;;   face      : face    the face of the highlighted line

;;

(defsubst eserve-mark-type-fgColor (eserve-mark)

;; return the foreground color of MARK-TYPE (aref eserve-mark 0))

(defsubst eserve-mark-type-bgColor (eserve-mark)

;; return the background color of MARK-TYPE
```

```
  (aref eserve-mark 1))

(defsubst eserve-mark-type-glyphFile (eserve-mark)

;; return the glyph file name of MARK-TYPE (aref eserve-mark 2))

(defsubst eserve-mark-type-glyph (eserve-mark)

;; return the glyph itself of MARK-TYPE (aref eserve-mark 3))

(defsubst eserve-mark-type-face (eserve-mark)

;; return the face of MARK-TYPE (aref eserve-mark 4))

(defun eserve-init-mark-types (mark-type-list)

;; For XEmacs only, for each element of the mark-type list, initialize the

;; glyph.

(cond ((vectorp mark-type-list)

(mapcar 'eserve-init-mark-type mark-type-list))

(t t)))

(defun eserve-init-mark-type (mark-type)
```

```
;; Make a pixmap out of the glyphFile specified and store it in
the glyph

;; object.  Create a new face and set its foreground and
background

;; colors.  Then append the mark-type to the eserve-mark-type-
list.

;; TBD: file checks for glyphFile

;; TBD: protect against errors in making the pixmap (incorrect
format, etc.)

(when (and (eserve-mark-type-glyphFile mark-type)

running-xemacs)

(aset mark-type 3 (make-pixmap (eserve-mark-type-glyphFile
mark-type)))

(set-pixmap-contributes-to-line-height (aref mark-type 3) nil))

;; if there is not an existing face and either a foreground or
background

;; color, then create a face and set its foreground and
background colors (when (and (not (eserve-mark-type-face mark-type))

(or (eserve-mark-type-fgColor mark-type)

(eserve-mark-type-bgColor mark-type)))

(let ((fgColor (eserve-mark-type-fgColor mark-type))

(bgColor (eserve-mark-type-bgColor mark-type))

(face (aset mark-type 4 (copy-face 'eserve-highlight
(gensym)))))

(when fgColor(set-face-foreground face fgColor))

(when bgColor(set-face-background face bgColor)))))
```

```
;;
;; eserve-menu object functions
;;

;;
;; an eservemenu object has the form:
;;    [eservemenu LABEL NUMITEMS ITEMS HANDLE]
;;
;; 'eservemenu  : symbol, identifies this vector as an eserve-menu
;;    label     : string, displayed in menu bar
;;    numitems  : integer, number of menu items in items array
;;    items     : array of menu items
;;    handle    : editor specific handle to menu (defun eserve-menup (x)
  "returns t if x is an eservemenu"
  (and (vectorp x) (= (length x) 5) (eq (aref x 0) 'eservemenu)))

(defun eserve-menu-label (eservemenu)
  "returns the label of an eservemenu"
  (aref eservemenu 1))

(defun eserve-menu-numitems (eservemenu)
  "returns the number of menu items for an eservemenu"
  (aref eservemenu 2))
```

```
(defun eserve-menu-items (eservemenu)
  "returns the array of menu items for an eservemenu"
  (aref eservemenu 3))

(defun eserve-menu-handle (eservemenu)
  "returns the editor specific handle for an eservemenu"
  (aref eservemenu 4))

(defun eserve-set-menu-label (eservemenu newlabel)
  "sets the label of an eservemenu"
  (aset eservemenu 1 newlabel))

(defun eserve-set-menu-numitems (eservemenu newnum)
  "sets the number of menu items for an eservemenu"
  (aset eservemenu 2 newnum))

(defun eserve-set-menu-items (eservemenu newitems)
  "sets the menu items for an eservemenu"
  (aset eservemenu 3 newitems))

(defun eserve-set-menu-handle (eservemenu newhandle)
  "sets the editor specific handle for an eservemenu"
  (aset eservemenu 4 newhandle))
```

```
;;
;; eserve-button object functions
;;

;;
;; an eservebutton object has the form:
;;     [eservebutton LABEL VERB NEEDFILEPOS HELP SENSE_ACCELERATOR]
;;
;;   'eservebutton : symbol, identifies this vector as an eserve-button
;;   label        : string, displayed in button
;;   verb         : string, verb (action) sent when button is selected
;;   needfilepos  : bool, if t then send file position info with verb
;;   help         : string, documents button for user
;;   accelerator  : string, key binding to invoke button
;;   sense        : bool, if t, button is enabled
;;   sensesym     : symbol, used to store sense value
;;   iconfile     : string, file containing icon definition
;;   offset       : integer, offset in pixels from previous button (defun eserve-buttonp (x)
   "returns t if x is an eservebutton"
   (and (vectorp x) (= (length x) 10) (eq (aref x 0)
'eservebutton)))
```

```
(defun eserve-button-label (eservebutton)
  "returns the label of an eservebutton"
  (aref eservebutton 1))

(defun eserve-button-verb (eservebutton)
  "returns the verb of an eservebutton"
  (aref eservebutton 2))

(defun eserve-button-needfilepos (eservebutton)
  "returns the needfilepos member of an eservebutton"
  (aref eservebutton 3))

(defun eserve-button-help (eservebutton)
  "returns the help member of an eservebutton"
  (aref eservebutton 4))

(defun eserve-button-accelerator (eservebutton)
  "returns the accelerator member of an eservebutton"
  (aref eservebutton 5))

(defun eserve-button-sense (eservebutton)
  "returns the sense member of an eservebutton"
  (aref eservebutton 6))

(defun eserve-button-sensesym (eservebutton)
```

```
   "returns the sensesym member of an eservebutton"
   (aref eservebutton 7))

(defun eserve-button-iconfile (eservebutton)
   "returns the iconfile member of an eservebutton"
   (aref eservebutton 8))

(defun eserve-button-offset (eservebutton)
   "returns the offset member of an eservebutton"
   (aref eservebutton 9))

(defun eserve-set-button-label (eservebutton newlabel)
   "sets the label of an eservebutton"
   (aset eservebutton 1 newlabel))

(defun eserve-set-button-verb (eservebutton newverb)
   "sets the verb member for an eservebutton"
   (aset eservebutton 2 newverb))

(defun eserve-set-button-needfilepos (eservebutton newneedfilepos)
   "sets the needfilepos member an eservebutton"
   (aset eservebutton 3 newneedfilepos))

(defun eserve-set-button-help (eservebutton newhelp)
   "sets the help member an eservebutton"
```

```
    (aset eservebutton 4 newhelp))

(defun eserve-set-button-accelerator (eservebutton newaccelerator)
  "sets the accelerator member an eservebutton"
  (aset eservebutton 5 newaccelerator))

(defun eserve-set-button-sense (eservebutton newsense)
  "sets the sense member an eservebutton"
  (aset eservebutton 6 newsense))

(defun eserve-set-button-sensesym (eservebutton newsensesym)
  "sets the sensesym member an eservebutton"
  (aset eservebutton 7 newsensesym))

(defun eserve-set-button-iconfile (eservebutton newiconfile)
  "sets the iconfile member an eservebutton"
  (aset eservebutton 7 newiconfile))

(defun eserve-set-button-offset (eservebutton newoffset)
  "sets the offset member an eservebutton"
  (aset eservebutton 7 newoffset))

;;
;; button support functions
;;
```

```
(defun eserve-button-create-cmd (eservebutton name-prefix)
  "creates a command function to be invoked when the eservebutton
is selected"
  (cond
    ((and name-prefix eservebutton)
     (let ((func-name (intern (concat name-prefix
                        (eserve-button-label eservebutton)))))
       (eval (` (defun (, func-name) ()
           (interactive)
           (eserve-send-verb (, (eserve-button-verb eservebutton))
                     (, (eserve-button-needfilepos
eservebutton))))))))))

(defun eserve-button-create-sensesym (eservebutton name-prefix)
  "creates the symbol which when evaluated determines button sense"
  (cond
    ((and name-prefix eservebutton)
     (intern (concat name-prefix "-"
             (eserve-button-label eservebutton) "-sense")))))

(defun eserve-register-button (button)
  "adds BUTTON to the verb button hash table"
  (let ((verb (eserve-button-verb button))
        (button-list nil))
    (cond
```

```
      (verb (setq button-list (cl-gethash verb eserve-verb-button-hash))

(cl-puthash verb (cons button button-list) eserve-verb-
button-hash)))))

(defun eserve-set-sensitivity (verb-sense)

"sets the sensitivity of the buttons corresponding VERB-SENSE
pair"

(let ((verb (aref verb-sense 0))

(sense (aref verb-sense 1))

(sense-sym nil)

(button-list nil))

(setq button-list (cl-gethash verb eserve-verb-button-hash))

(while button-list (set (eserve-button-sensesym (car button-list)) sense)

(setq button-list (cdr button-list)))))

(defun eserve-set-sensitivities (verb-sense-array)

"applies the sense values in VERB-SENSE-ARRAY to the existing
eserve buttons"

(mapcar 'eserve-set-sensitivity verb-sense-array)

(cond ((and running-xemacs (not eserve-use-bb-toolbar))  ;; 19.11

(eserve-update-frame-toolbars)

)))

;;
```

```
;; menu support functions
;;

(defun eserve-emacs-add-menus (menus)
  "adds menus from the MENUS list to the menu bar"
  (mapcar 'eserve-emacs-menu-add (reverse menus))
  (setq eserve-menus menus)
  (redraw-display))

(defun eserve-emacs-delete-menus (menus)
  "deletes menus from the MENUS list from the menu bar"
  (cond
   (menus
    (mapcar 'eserve-emacs-menu-delete menus)
    (setq eserve-menus nil)
    (redraw-display))))

(defun eserve-xemacs-add-menus (menus)
  "adds menus from the MENUS list to the menu bar"
  (mapcar 'eserve-xemacs-menu-add menus)
  (setq eserve-menus menus))

(defun eserve-xemacs-delete-menus (menus)
  "deletes menus from the MENUS list from the menu bar"
  (cond
```

```
    (menus (mapcar 'eserve-xemacs-menu-delete menus)

(setq eserve-menus nil))))

(defun eserve-xemacs-menu-add (eservemenu)

"adds a ESERVEMENU to the xemacs menu bar"

(cond ((and eservemenu (eserve-menup eservemenu))

(let ((handle (` ( (, (eserve-menu-label eservemenu) ))))

(buttons nil)

(menulist nil)

(index 0)

(max-items (eserve-menu-numitems eservemenu)))

(eserve-set-menu-handle eservemenu handle)

(setq buttons (eserve-menu-items eservemenu))

(while (< index max-items)

(setq menulist (append menulist (list (eserve-xemacs-menuitem-create eservemenu (aref buttons index)))))

(setq index (+ index 1)))

(add-menu nil (eserve-menu-label eservemenu) menulist)))))

(defun eserve-xemacs-menuitem-create (eservemenu eservebutton)

"returns an xemacs menuitem from ESERVEBUTTON"

(let ((menuitem (make-vector 4 nil)))
```

```
    (aset menuitem 0 (eserve-button-label eservebutton))

(aset menuitem 1 (eserve-button-create-cmd eservebutton
(eserve-menu-label eservemenu)))

(eserve-set-button-sensesym eservebutton (eserve-button-create-sensesym eservebutton (eserve-menu-label
eservemenu)))

(set (eserve-button-sensesym eservebutton)

(eserve-button-sense eservebutton))

(aset menuitem 2 (eserve-button-sensesym eservebutton))

(eserve-register-button eservebutton)

menuitem))

(defun eserve-xemacs-menu-delete (eservemenu)

"delete a ESERVEMENU from the xemacs menu bar"

(cond ((and eservemenu (eserve-menup eservemenu))

(delete-menu-item (eserve-menu-handle eservemenu)))))

(defun eserve-emacs-menu-add (eservemenu)

"adds a ESERVEMENU to the menu bar"

(cond ((and eservemenu (eserve-menup eservemenu))

(let ((handle (` [menu-bar (, (intern (eserve-menu-label
eservemenu))) ]))

(kmap (make-sparse-keymap (eserve-menu-label eservemenu)))

(index (eserve-menu-numitems eservemenu))

(button-cmd nil)
```

61

```
        (button nil))

(define-key global-map handle (cons (eserve-menu-label
eservemenu) kmap))

(eserve-set-menu-handle eservemenu handle)

(while (> index 0)

(setq button (aref (eserve-menu-items eservemenu) (- index
1)))

(setq button-cmd (eserve-button-create-cmd button (eserve-
menu-label eservemenu)))

(define-key kmap (` [ (, (intern (eserve-button-label
button))) ])

(` ( (, (eserve-button-label button))

(, (eserve-button-help button)) .

(, button-cmd))))

(eserve-set-button-sensesym button (eserve-button-create-sensesym button (eserve-menu-label
eservemenu)))

(set (eserve-button-sensesym button) (eserve-button-sense
button))

(put button-cmd 'menu-enable (eserve-button-sensesym button))

(eserve-register-button button)

(setq index (- index 1)))

(setq menu-bar-final-items (append (list (intern (eserve-menu-label
eservemenu)))

menu-bar-final-items))))))

(defun eserve-emacs-menu-delete (eservemenu)

"delete a ESERVEMENU from the emacs menu bar"
```

```
  (cond
    ((and eservemenu (eserve-menup eservemenu))
     (global-unset-key (eserve-menu-handle eservemenu))
     (setq menu-bar-final-items
         (delete (intern (eserve-menu-label eservemenu))
              menu-bar-final-items)))))

;;
;; version control support
;;
(defun eserve-emacs-vc-setup ()
  "sets up the VC menu for GNU emacs"
  (require 'vc)
  (cond
    ((not (or (keymapp (lookup-key global-map [menu-bar vc]))
          (keymapp (lookup-key global-map [menu-bar VC]))))
     (setq eserve-vc-teardown-menu t)
     (defvar eserve-vc-menu (make-sparse-keymap "eserve-vc"))
     (define-key global-map [menu-bar vc] (cons "VC" eserve-vc-menu))

(define-key eserve-vc-menu [eserve-vc-list-reg-files]
       (cons "List Registered Files" 'eserve-vc-directory4))
     (define-key eserve-vc-menu [eserve-vc-list-any-locked-files]
       (cons "List Locked Files Any User" 'vc-directory))
     (define-key eserve-vc-menu [eserve-vc-list-locked-files]
```

```
      (cons "List Locked Files" 'eserve-vc-directory16))

(define-key eserve-vc-menu [eserve-vc-print-log]

(cons "Show Edit History" 'vc-print-log))

(define-key eserve-vc-menu [separator2]

'("----" . nil))

(define-key eserve-vc-menu [eserve-vc-revert-buffer]

(cons "Revert File" 'vc-revert-buffer))

(setq eserve-vc-next-op-item (define-key eserve-vc-menu
[eserve-vc-next-action]

(cons "NEXT-OPERATION" 'vc-next-action)))

(put 'vc-revert-buffer 'menu-enable 'vc-mode)

(put 'vc-diff 'menu-enable 'vc-mode)

(put 'vc-print-log 'menu-enable 'vc-mode)

(put 'vc-next-action 'menu-enable '(eserve-vc-menu-sensitize))

(setq menu-bar-final-items (append '(vc) menu-bar-final-
items)))))

(defun eserve-emacs-vc-cleanup ()

"tears down the VC menu for GNU emacs"

(cond (eserve-vc-teardown-menu (global-unset-key [menu-bar vc])

(setq eserve-vc-teardown-menu nil))))

(defun eserve-vc-directory16 ()
```

```
    (interactive)
    (vc-directory '(16))))

(defun eserve-vc-directory4 ()
    (interactive)
    (vc-directory '(4))))

(defun eserve-vc-menu-sensitize ()
    (let ((file (if buffer-file-name
                    (file-name-nondirectory buffer-file-name)
                    (buffer-name)))
          (owner nil))
        (setcar eserve-vc-next-op-item
                (cond ((not vc-mode)
                        "Register File")
                      ((not (setq owner (vc-locking-user file)))
                        "Check out File")
                      ((not (string-equal owner (user-login-name)))
                        "Steal File Lock")
                      (t "Check in File")))))

(defun eserve-xemacs-vc-setup ()
    "sets up the VC menu for XEmacs"
    (require 'vc)
```

```
  (cond ((and (not (assoc "VC" current-menubar))

(boundp 'vc-default-menu))

(setq eserve-vc-teardown-menu t)

(add-menu () "VC" vc-default-menu))))

(defun eserve-xemacs-vc-cleanup ()

"tears down the VC menu for XEmacs"

(cond (eserve-vc-teardown-menu

;; for now do nothing (setq eserve-vc-teardown-menu nil))))

;;
;; file/buffer utility functions
;;

(defun eserve-file-to-buffer (file-name)

"Returns the buffer containing the contents of FILENAME or nil\n\
if no such buffer exists."

(get-file-buffer (expand-file-name (abbreviate-file-name file-name))))

(defun eserve-file-to-buffer-create (file-name)

"returns the buffer containing the contents of FILENAME (creates
the buffer if not found)"
```

```
  (let ((full-file-name (abbreviate-file-name file-name))
        (file-buff nil))
    (setq file-buff (get-file-buffer full-file-name))
    (cond
     (file-buff file-buff)
     (t (find-file-noselect full-file-name)))))

(defun eserve-line-to-pos (file-buffer line-no)
  "returns the character position of LINENO in BUFFER"
    (save-excursion
      (set-buffer file-buffer)
      (goto-char 1)
      (goto-line line-no)
      (point)))

(defun eserve-cursor-line ()
  (save-excursion
    (progn (beginning-of-line) (count-lines 1 (point)))))

(defun eserve-cursor-column ()
  (current-column))

(defun eserve-current-selection ()
  "return the text of the current selection"
  (save-excursion
```

```
(let ((sel-text nil)
    (sel-exists (x-selection-exists-p 'PRIMARY))
    (own-text (x-selection-owner-p))
    (message-string nil))
  (cond
   ((and sel-exists own-text)
     (setq sel-text (x-get-selection-internal 'PRIMARY 'STRING)))
   (t
     nil)))))

(defun eserve-show-buffer (file-buffer)
  "switches current window to FILEBUFFER"
    (cond
      (file-buffer
        (switch-to-buffer file-buffer))))

(defun eserve-raise-buffer (file-buffer)
  "raises the X window containing FILEBUFFER"
  (cond
    (file-buffer
      (raise-frame (window-frame (get-buffer-window file-buffer))))))

(defun eserve-add-to-path (dir)
  "adds DIR to the emacs LOAD-PATH"
  (cond
```

```
        ((and dir
            (stringp dir)
            (not (member dir load-path)))
          (setq load-path
            (append (list (expand-file-name dir)) load-path)))))

;;
;; hook functions for editor events
;;

(defun eserve-find-file-hook ()
  "notifies client that new file has been loaded into emacs"
  (let ((file-name (buffer-file-name nil))
        (file-buffer nil))
    (cond
      (file-name
        (setq file-buffer (eserve-file-to-buffer file-name))
        (cond
          (file-buffer
            (eserve-event-loaded-file file-name)))))))

(defun eserve-first-change-hook ()
  "notifies client that file has been modified by_emacs"
  (let ((file-name (buffer-file-name nil)))
    (cond
```

```
          (file-name
           (eserve-event-modified-file file-name)))))

(defun eserve-after-save-hook ()
  "notifies client that new file has been saved by emacs"
  (let ((file-name (buffer-file-name nil)))
    (cond
     (file-name
      (eserve-event-saved-file file-name)))))

(defun eserve-kill-buffer-hook ()
  "deletes buffer from eserve lists and informs eserve of event"
  (cond
   (buffer-file-name
    (let ((deleted-buffer (get-file-buffer buffer-file-name)))
      (eserve-log-text (format "eserve-kill-buffer hook -buffer name %s\n" buffer-file-name))
      (if (not deleted-buffer)
          (eserve-log-text "eserve-kill-buffer hook -no deleted buffer\n"))
      (cond
       (deleted-buffer
        (eserve-event-deleted-file buffer-file-name)
        (cond
         ((eserve-get-buffer-marks deleted-buffer)
          (eserve-delete-buffer-marks deleted-buffer)))))))))
```

```
    (t
      (eserve-log-text "eserve-kill-buffer hook - no buffer
name\n"))))

;;
;; event functions - used to inform eserve of events occurring
;; in emacs
;;
(defun eserve-event-deleted-file (deleted-file-name)
  "informs eserve that DELETEDFILENAME has been deleted"
  (let ((event-string (concat "deletedFile " deleted-file-name
"\n")))
    (eserve-process-send-string eserve-connection event-string)
    (eserve-log-text (format "(%s)\n" event-string))))

(defun eserve-event-loaded-file (loaded-file-name )
  "informs eserve that LOADEDFILENAME has been loaded"
  (let ((event-string (concat "loadedFile " loaded-file-name "
0\n")))
    (eserve-process-send-string eserve-connection event-string)
    (eserve-log-text (format "(%s)\n" event-string))))

(defun eserve-event-modified-file (modified-file-name)
  "informs eserve that MODIFIEDFILENAME has been modified"
  (let ((event-string (concat "modifiedFile " modified-file-name
"\n")))
    (eserve-process-send-string eserve-connection event-string)
```

```
      (eserve-log-text (format "(%s)\n" event-string))))

(defun eserve-event-saved-file (saved-file-name)
  "informs eserve that SAVEDFILENAME has been loaded"
  (let ((event-string (concat "savedFile " saved-file-name "\n")))
    (eserve-process-send-string eserve-connection event-string)
    (eserve-log-text (format "(%s)\n" event-string))))

(defun eserve-editor-version ()
  "returns a string containing the major/minor version number"
  (let ((version-end (string-match " " emacs-version))
        (editor-version emacs-version))
    (cond
     (version-end
      (setq editor-version (substring emacs-version 0
                                      version-end))))
    editor-version))

(defun eserve-event-connected ()
  "informs eserve that it is connected to emacs"
  (let ((event-string nil))
    (cond
     (running-xemacs
      (setq event-string (format "connected xemacs %d %s\n"
                                 eserve-protocol-version
```

```
                        (eserve-editor-version))))
    (t
      (setq event-string (format "connected emacs %d %s\n"
                      eserve-protocol-version
                      (eserve-editor-version)))))
    (eserve-process-send-string eserve-connection event-string)
    (eserve-log-text (format "(%s)\n" event-string))))

;;
;; eserve function key binding registration/invocation functions
;;

(defun eserve-add-fkey-function (funcname)
  "registers fkey-binding function named by the atom FUNCNAME to be
called at connect time"
  (cond
    ((and funcname (symbolp funcname)
        (fboundp funcname))
      (setq eserve-fkey-functions (append eserve-fkey-functions
                    (list (symbol-function funcname))))))))

(defun eserve-init-fkey-functions ()
  "calls all the registered function key binding_functions"
  (mapcar 'funcall eserve-fkey-functions))

;;;
```

```
;;; Toolbar (aka buttonbar) functions

;;;

(defun eserve-set-bb-tb-table (toolbar-table)  ;; 19.11

"Sets eserve-toolbar-table to TOOLBAR-TABLE, performs all needed initializations and displays the toolbar.  [Returns TBD if successful, or TBD if a non-fatal error is raised.  Signals the error TBD otherwise.]"

)

(defun eserve-toggle-frame-toolbar (frame)

"toggles TOOLBAR for FRAME"

(cond ((equal eserve-current-toolbar (specifier-instance top-toolbar frame))

(eserve-deinstall-frame-toolbar frame))

(t (eserve-install-frame-toolbar frame eserve-current-toolbar))))

(defun eserve-install-frame-toolbar (frame toolbar)

"saves current toolbar info for FRAME and puts up TOOLBAR on FRAME"

(eserve-save-frame-toolbar frame)

(eserve-set-frame-toolbar frame toolbar))

(defun eserve-deinstall-frame-toolbar (frame)
```

```
  "takes down current toolbar on FRAME and puts up previous
toolbar"

(let ((toolbar-info (assoc frame eserve-frame-previous-toolbar-
alist)))

(cond (toolbar-info (eserve-restore-frame-toolbar toolbar-info)))))

(defun eserve-set-frame-toolbar (frame toolbar)

"put TOOLBAR up on FRAME"

;;  (add-spec-to-specifier top-toolbar-height frame eserve-toolbar-
icon-height)

(add-spec-to-specifier top-toolbar toolbar frame))

(defun eserve-save-frame-toolbar (frame)

"save current toolbar info for FRAME so we can restore it later"

(let ((toolbar-info (assoc frame eserve-frame-previous-toolbar-
alist)))

(cond (toolbar-info (setcdr toolbar-info (list (specifier-instance top-toolbar-
height frame))))

(t (setq eserve-frame-previous-toolbar-alist (append (list (list frame (specifier-instance top-toolbar-height
(selected-frame))))

eserve-frame-previous-toolbar-alist))))))
```

```
(defun eserve-restore-frame-toolbar (toolbar-info)
  "restore information from TOOLBAR-INFO"
  (let ((frame (nth 0 toolbar-info))
        (toolbar-height (nth 1 toolbar-info)))
    (cond
     ((frame-live-p frame)
      (remove-specifier top-toolbar frame)
;;    (add-spec-to-specifier top-toolbar-height toolbar-height frame)
      ))
    (setq eserve-frame-previous-toolbar-alist
          (delq toolbar-info eserve-frame-previous-toolbar-alist))))

(defun eserve-update-frame-toolbars ()
  "update all eserve frame toolbars"
  (mapcar '(lambda (tb-info)
             (add-spec-to-specifier
              top-toolbar eserve-current-toolbar (nth 0 tb-info)))
          eserve-frame-previous-toolbar-alist))

(defun eserve-set-toolbar-table (toolbar-table)
  "Sets eserve-toolbar-table to TOOLBAR-TABLE, performs all needed
  initializations and displays the toolbar.  [Returns TBD if successful, or TBD
  if a non-fatal error is raised.  Signals the error TBD otherwise.]"
```

```
(cond
 (running-xemacs
  (let ((old-tb-bg-attr (assoc "BgColor" xpm-color-symbols))
        (new-tb-bg-color nil)
        (new-tb-bg-attr nil))
    (message "Initializing toolbar ...")
    ;; toolbar checks
    (when (not (vectorp toolbar-table))
       (signal 'wrong-type-arg '(toolbar-table)))
    ;; temporary variable
    (setq eserve-use-bb-toolbar nil) ;; 19.11

;; substitute toolbar background for icon bg color
    (setq new-tb-bg-color (cdr (assq 'background-toolbar-color
                     (frame-parameters (selected-frame)))))
    (cond
     ((not new-tb-bg-color)
       (setq new-tb-bg-color (face-background 'default))))
    (setq xpm-color-symbols (delete old-tb-bg-attr xpm-color-symbols))
    (setq xpm-color-symbols
        (append
         (list
          (` ("BgColor" (, new-tb-bg-color))))
         xpm-color-symbols))
    ;; create and install toolbar
```

```
    (when (not eserve-current-toolbar)

(eserve-init-toolbar toolbar-table))

(eserve-install-frame-toolbar (selected-frame) eserve-
current-toolbar)

;; substitute previous/saved bg color for icon bg color (setq new-tb-bg-attr (assoc "BgColor" xpm-color-symbols))

(setq xpm-color-symbols (delq new-tb-bg-attr xpm-color-
symbols))

(setq xpm-color-symbols (append (list old-tb-bg-attr)

xpm-color-symbols))

(message "")))))

(defun eserve-init-toolbar (toolbar-table)

(setq eserve-toolbar-table toolbar-table) ; Save toolbar-table (setq eserve-current-toolbar nil)      ;delete any previous
toolbars (mapcar 'eserve-init-toolbar-item toolbar-table))

(defun eserve-init-toolbar-item (toolbar-item)

(let ((verb    (eserve-button-verb toolbar-item))

(filePos (eserve-button-needfilepos toolbar-item))

(button-cmd (eserve-button-create-cmd toolbar-item "eserve-
toolbar"))

(button-sense (eserve-button-sense toolbar-item))

(button-sensesym (eserve-button-create-sensesym toolbar-item
"eserve-toolbar"))

(button-space (eserve-button-offset toolbar-item))

(spacer nil))
```

```
     (set button-sensesym button-sense)

(eserve-set-button-sensesym toolbar-item button-sensesym)

(eserve-register-button toolbar-item)

(cond ((and (integerp button-space) (> button-space 0))

(setq spacer (list (vector ':size button-space ':style '2d)))))

(setq eserve-current-toolbar (append eserve-current-toolbar spacer (list (vector (list (make-pixmap (eserve-button-iconfile toolbar-item)))

button-cmd button-sensesym (eserve-button-help toolbar-item)))

))))

;;;

;;; XEmacs-specific functions

;;;

(defun eserve-xemacs-create-extent (mark-type start end)
```

```
;; Create an extent in the current buffer with the properties of
MARK-TYPE

;; and return it.  The function `eserve-create-overlay-or-extent'
is aliased

;; to this one when running XEmacs.  Note, the arguments START
and END are

;; not used and are present only because the corresponding
function in GNU

;; Emacs `eserve-emacs-create-overlay' needs them.

(when (or (eserve-mark-type-fgColor mark-type)

(eserve-mark-type-bgColor mark-type)

(eserve-mark-type-face    mark-type))

(let ((pixmap (eserve-mark-type-glyph mark-type))

(face (eserve-mark-type-face mark-type))

(extent (make-extent start end (current-buffer))))  ;no
location!

(if face (set-extent-face extent face)

(set-extent-face extent 'eserve-highlight))

(when pixmap (set-extent-begin-glyph extent pixmap 'outside-margin)

(set-buffer-left-margin-width 3))

;;`after-change-function' is buffer local (setq after-change-function 'eserve-xemacs-change-function)
;TBD: Replace extent)))                              ;return the newly created
extent
```

```
(defun eserve-xemacs-change-function (start end old-length)

;; Called by `after-change-function' to see if a newline was
inserted and

;; if so, to terminate the extent before that point.  TBD: the

;; corresponding operation of gluing two lines together to form a
single

;; highlighted line.
  (save-excursion (goto-char start)

(when (and (re-search-forward "\n" end t) ;return nil on
failure (<= (point) end)

(let ((extent (extent-at (point)))) ;returns smallest extent (if extent (set-extent-endpoints extent (extent-start-
position extent)

(point)))))))))

(defun eserve-xemacs-delete-extent (extent)

(when extent (delete-extent extent)

(setq after-change-function nil)))

;;;

;;; GNU Emacs-specific functions

;;;
```

```
(defun eserve-emacs-create-overlay (mark-type start end)

;; Create an overlay with the properties specified by MARK TYPE
and return

;; it.  The function `eserve-create-overlay-or-extent' is aliased
to this one

;; when running GNU Emacs v19.  N.B.  There are no pixmaps (i.e.
true

;; glyphs) in GNU Emacs v19.  TBD: replace use of gensym.

(let ((overlay (make-overlay start end))

(face (eserve-mark-type-face mark-type)))

(cond (face (overlay-put overlay 'face (face-name face))

(overlay-put overlay 'modification-hooks (list 'eserve-emacs-modification-function))

overlay))))

(defun eserve-emacs-delete-overlay (overlay)

(when overlay (delete-overlay overlay)))

(defun eserve-emacs-modification-function (overlay start end)

;; Called by the modification hook in the overlay to see if a
newline was

;; inserted and if so, to terminate the extent before that point.
TBD:
```

```
  ;; the corresponding operation of gluing two lines together to
form a
  ;; single highlighted line.
  (save-excursion
      (if (string-match "
" (this-command-keys))
        (move-overlay overlay (overlay-start overlay) (point)))))

(provide 'eserve)   ;Announce that we're providing the package
'eserve'.

;; Copyright (C) 09 Jun 1995  Sun Microsystems, Inc.
```

What is claimed is:

1. An apparatus comprising a system for relating at least one error message with information relevant to the message, the system comprising:

a filter for filtering the at least one error message to generate link information comprising at least one location of the information relevant to at least a first portion of at least one of the error messages;

a links manager coupled to the filter for displaying at least one error message and accepting input from a user to indicate at least a second portion of at least one of the error messages; and a control manager for directing the operation of a program responsive to the second portion of the error message indicated.

2. A method of directing a program to display information relevant to at least a first portion of an error message selected by a user, the method comprising:

generating link information responsive to the error message, the link information comprising at least one location of information relevant to the error message;

dividing the error message into at least one second portion;

associating at least one of the second portions of the divided error message with the link information generated;

accepting input from a user to designate at least one of the second portions of the divided error message; and sending the program the location of the relevant information associated with the second portion of the error message designated.

3. The method of claim 2 wherein at least one location of information relevant to the error message comprises a program identifier.

4. The method of claim 3 wherein at least one location of information relevant to the error message comprises a file identifier and file location information.

5. The method of claim 4 wherein the file location information comprises a file line number.

6. The method of claim 5 wherein the file location information additionally comprises a file column number.

7. The method of claim 2 comprising the additional step of displaying the error message to the user.

8. The method of claim 7 wherein the displaying step comprises highlighting at least one third portion of the divided error message.

9. The method of claim 8 wherein the accepting step comprises receiving user pointing device status information.

10. The method of claim 9 comprising the additional step of identifying at least one display location of at least one displayed fourth portion of the divided error message.

11. The method of claim 10 comprising the additional step of relating the user pointing device status information received to the display location of at least one displayed fourth portion of the divided error message identified.

12. A computer program product comprising a computer usable medium having computer readable code embodied therein for directing a program to display information relevant to at least a first portion of at least one error message selected by a user, the computer program product comprising:

computer readable program code devices configured to cause a computer to generate link information responsive to the at least one error message, the link information comprising at least one location of information relevant to the error message;

computer readable program code devices configured to cause the computer to divide at least one of the error messages into at least one second portion;

computer readable program code devices configured to cause the computer to associate at least one second portion of the divided error message with at least a portion of the link information generated;

computer readable program code devices configured to cause the computer to accept input from a user to designate at least one of the second portions of the divided error messages; and computer readable program code devices configured to cause the computer to send the program the location of the relevant information associated with the second portion of the error message designated.

13. The computer program product of claim 12 wherein at least one location of information relevant to the error message comprises a program identifier.

14. The computer program product of claim 13 wherein at least one location of information relevant to the error message comprises a file identifier and file location information.

15. The computer program product of claim 14 wherein the file location information comprises a file line number.

16. The computer program product of claim 15 wherein the file location information additionally comprises a file column number.

17. The computer program product of claim 12 additionally comprising computer readable program code devices configured to cause the computer to display the error message to the user.

18. The computer program product of claim 17 wherein the computer readable program code devices configured to cause the computer to display the error message to the user comprise computer readable program code devices configured to cause the computer to highlight at least one third portion of the divided error message.

19. The computer program product of claim 18 wherein the computer readable program code devices configured to cause the computer to accept input from a user to designate at least one of the third portions of the divided error messages comprises computer readable program code devices configured to receive user pointing devices status information.

20. The computer program product of claim 12 additionally comprising computer readable program code devices configured to cause the computer to identify at least one display location of at least one displayed fourth portion of at least one divided error message.

21. The computer program product of claim 20 additionally comprising computer readable program code devices configured to cause the computer to relate the user pointing device status information received to the display location of at least one displayed fourth portion of at least one divided error message identified.

22. A computer system for generating a hyperlinked error message from a text error message output from a compiler, comprising:

a filter that identifies error location text data in the text error message; and a hypertext link manager, coupled to the filter, that generates a first hypertext link from the identified error location text data and replaces the error location text data with the first hypertext link to an error location in a source code file corresponding to the error location text data.

23. The system of claim 22 wherein the hypertext link manager embeds the first hypertext link into the error location text data.

24. The system of claim 22 wherein:
the filter identifies help information text data in the text error message; and
the hypertext link manager replaces the help information text data with a second hypertext link to a help file corresponding to the help information text data.

25. A computer implemented method for generating a hyperlinked error message from a text error message output from a compiler, comprising:
receiving the text error message;
identifying error location information in the received text error message;
generating a hypertext link to an error location in a source code file corresponding to the error location information; and
replacing the error location information with the hypertext link.

26. The method of claim 25 wherein replacing the error location information with a hypertext link comprises embedding the hypertext link into the help information text data.

* * * * *